United States Patent
Lee et al.

(10) Patent No.: US 8,787,486 B2
(45) Date of Patent: Jul. 22, 2014

(54) DISTANCE-LEVEL COMBINING FOR MIMO SYSTEMS WITH HARQ AND/OR REPETITION CODING

(71) Applicant: Marvell World Trade Ltd., St. Michael (BB)

(72) Inventors: Jungwon Lee, San Diego, CA (US); Woong Jun Jang, Seoul (KR)

(73) Assignee: Marvell World Trade Ltd., St. Michael (BB)

(*) Notice: Subject to any disclaimer, the term of this patent is extended or adjusted under 35 U.S.C. 154(b) by 0 days.

(21) Appl. No.: 14/167,661

(22) Filed: Jan. 29, 2014

(65) Prior Publication Data
US 2014/0133610 A1  May 15, 2014

Related U.S. Application Data

(63) Continuation of application No. 11/833,827, filed on Aug. 3, 2007.

(60) Provisional application No. 60/821,773, filed on Aug. 8, 2006.

(51) Int. Cl.
*H04B 7/02* (2006.01)

(52) U.S. Cl.
USPC ........... 375/267; 375/260; 375/262; 375/341; 375/347; 370/203; 370/208; 370/210; 370/328; 370/329; 370/332; 370/333; 370/334

(58) Field of Classification Search
USPC .......... 375/260, 262, 267, 347; 370/203–208, 370/328, 329
See application file for complete search history.

(56) References Cited

U.S. PATENT DOCUMENTS

| | | | |
|---|---|---|---|
| 6,185,258 B1 | 2/2001 | Alamouti et al. | |
| 6,567,388 B1 | 5/2003 | Tomcik et al. | |
| 6,687,492 B1 | 2/2004 | Sugar et al. | |
| 6,778,619 B2 | 8/2004 | Zangi et al. | |

(Continued)

FOREIGN PATENT DOCUMENTS

| | | |
|---|---|---|
| EP | 1271835 | 1/2003 |
| EP | 1501210 | 1/2005 |

(Continued)

OTHER PUBLICATIONS

Koike, T.; Murata, H.; Yoshida, S.; , "Hybrid ARQ scheme suitable for coded MIMO transmission," Communications, 2004 IEEE International Conference on, pp. 2919-2923. vol. 5, Jun. 20-24, 2004.*

(Continued)

*Primary Examiner* — Daniel Washburn
*Assistant Examiner* — Eboni Hughes

(57) ABSTRACT

Systems and methods are provided for decoding signal vectors in multiple-input multiple-output (MIMO) systems, where the receiver has received one or more signal vectors from the same transmitted vector. For each received signal vector, the receiver evaluates a decoding metric using each possible value of the transmitted signal vector to produce a set of distances. The receiver then combines distances from across the received signal vectors to produce a combined distance associated with each possible value of the transmitted signal vector. Using the combined distances, the receiver may choose among the possible values of the transmit signal vector to determine the actual transmit signal vector.

20 Claims, 18 Drawing Sheets

(56) References Cited

U.S. PATENT DOCUMENTS

| | | | |
|---|---|---|---|
| 6,868,520 | B1 | 3/2005 | Fauconnier |
| 6,892,341 | B2 | 5/2005 | Golitschek et al. |
| 6,967,598 | B2 | 11/2005 | Mills |
| 7,031,419 | B2 | 4/2006 | Piirainen |
| 7,194,237 | B2 | 3/2007 | Sugar et al. |
| 7,295,624 | B2 | 11/2007 | Onggosanusi et al. |
| 7,308,026 | B2 | 12/2007 | Purho |
| 7,308,047 | B2 | 12/2007 | Sadowsky |
| 7,362,815 | B2 | 4/2008 | Lindskog et al. |
| 7,366,247 | B2 | 4/2008 | Kim et al. |
| 7,382,841 | B2 | 6/2008 | Ohtaki et al. |
| 7,386,079 | B2 | 6/2008 | Skog et al. |
| 7,428,269 | B2 | 9/2008 | Sampath et al. |
| 7,489,746 | B1 | 2/2009 | Awater et al. |
| 7,502,432 | B2 | 3/2009 | Catreux et al. |
| 7,526,038 | B2 | 4/2009 | McNamara |
| 7,539,274 | B2 | 5/2009 | Catreux et al. |
| 7,548,592 | B2 | 6/2009 | Wight |
| 7,554,985 | B2 | 6/2009 | Ihm et al. |
| 7,567,583 | B2 | 7/2009 | Miyoshi |
| 7,573,806 | B2 | 8/2009 | Ihm et al. |
| 7,590,204 | B2 | 9/2009 | Monsen |
| 7,593,489 | B2 | 9/2009 | Koshy et al. |
| 7,649,953 | B2 | 1/2010 | Bauch |
| 7,693,551 | B2 | 4/2010 | Ojard |
| 7,729,411 | B2 | 6/2010 | Wang et al. |
| 7,742,550 | B2 | 6/2010 | Olesen et al. |
| 7,751,506 | B2 | 7/2010 | Niu et al. |
| 7,782,971 | B2 | 8/2010 | Burg et al. |
| 7,885,364 | B2 | 2/2011 | Ito |
| 8,085,738 | B2 | 12/2011 | Park et al. |
| 8,279,966 | B2 | 10/2012 | Lee et al. |
| 8,320,509 | B2 | 11/2012 | Lee et al. |
| 8,379,743 | B2 | 2/2013 | Bury |
| 8,411,778 | B1 | 4/2013 | Lee et al. |
| 8,498,195 | B1 | 7/2013 | Lee et al. |
| 2003/0185295 | A1 | 10/2003 | Yousef |
| 2004/0181419 | A1 | 9/2004 | Davis et al. |
| 2006/0107167 | A1 | 5/2006 | Jeong et al. |
| 2006/0251156 | A1 | 11/2006 | Grant et al. |
| 2006/0274836 | A1 | 12/2006 | Sampath et al. |
| 2007/0155433 | A1 | 7/2007 | Ito et al. |
| 2007/0206531 | A1 | 9/2007 | Pajukoski et al. |
| 2007/0254662 | A1 | 11/2007 | Khan et al. |
| 2007/0268988 | A1* | 11/2007 | Hedayat et al. ............. 375/347 |
| 2007/0291882 | A1 | 12/2007 | Park et al. |
| 2008/0025427 | A1 | 1/2008 | Lee et al. |
| 2008/0025429 | A1 | 1/2008 | Lee et al. |
| 2008/0025443 | A1 | 1/2008 | Lee et al. |
| 2008/0037670 | A1 | 2/2008 | Lee et al. |
| 2008/0049865 | A1 | 2/2008 | Blankenship et al. |
| 2008/0063103 | A1 | 3/2008 | Lee et al. |
| 2008/0144733 | A1 | 6/2008 | ElGamal et al. |
| 2008/0159375 | A1 | 7/2008 | Park et al. |
| 2008/0198941 | A1 | 8/2008 | Song et al. |
| 2009/0031183 | A1* | 1/2009 | Hoshino et al. ............. 714/748 |
| 2009/0080579 | A1 | 3/2009 | Fujii |
| 2009/0252236 | A1* | 10/2009 | Li et al. .................... 375/260 |
| 2009/0307558 | A1 | 12/2009 | Lee et al. |
| 2010/0014601 | A1 | 1/2010 | Mo et al. |
| 2013/0083836 | A1 | 4/2013 | Lee et al. |
| 2013/0163657 | A1 | 6/2013 | Lee et al. |

FOREIGN PATENT DOCUMENTS

| | | |
|---|---|---|
| EP | 1 608 081 | 12/2005 |
| WO | WO 00/52873 | 9/2000 |
| WO | WO 02/067491 | 8/2002 |

OTHER PUBLICATIONS

Schmitt, M.P.; , "Improved retransmission strategy for hybrid ARQ schemes employing TCM," Wireless Communications and Networking Conference, 1999. WCNC. 1999 IEEE , pp. 1226-1228 vol. 3, 1999.*

802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, pp. 1-3, 485-495, 635, and 649-650 (Feb. 2006).

Acolatse, Kodzovi et al. "An Alamouti-based Hybrid-ARQ Scheme for MIMO Systems" 14th IST Mobile and Wireless Communications, Dresden (Jun. 2005).

Acolatse, Kodzovi et al. "Space Time Block Coding HARQ scheme for Highly Frequency Selective Channels" 2007 IEEE International Conference on Communications, pp. 4416-4420 (Jun. 24, 2007)

Alamouti, Siavash, M. "A Simple Transmit Diversity Technique for Wireless Communications." IEEE Journal on Select Areas in Communications, vol. 16, No. 8. (Oct. 1998).

Arkhipov, Alexander et al. "OFDMA-CDM Performance Enchancement by Combining H-ARQ and Interference Cancellation." IEEE Journal on Selected Areas in Communications, vol. 24, No. 6, pp.1199-1207 (Jun. 2006).

Chase, David. "Code Combining—A Maximum-Likelihood Decoding Approach for Combining an Arbitrary Number of Noisy Packets" *IEEE Transactions on Communications*, vol. Comm-33 No. 5, pp. 385-393 (May 1985).

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Cioffi, John et al. "Generalized decision-feedback equalization for packet transmission with ISI and gaussian noise", Communications, computation, control and signal processing: a tribute to Thomas Kailath, pp. 79-127 (1997).

Davis, Linda M. "Scaled and Decoupled Cholesky and QR Decompositions with Application to Spherical MIMO Detection" IEEE Wireless Communications and Networking, vol. 1, pp. 326-331 (2003).

Dekorsy, Armin "A Cutoff Rate based Cross-Layer Metric for MIMO-HARQ Transmission" IEEE 16th Internal Symposium on Personal, Indoor and Mobile Radio Communications, vol. 4, pp. 2166-2170 (2005).

Gharavi-Alkhansari, Mohammad et al. "Constellation Space Invariance of Space-Time Block Codes with Application to Optimal Antenna Subset Selection" Signal Processing Advances in Wireless Communications, pp. 269-273 (2003).

Ginis, George et al. "On the Relation Between V-BLAST and the GDFE", IEEE Communications Letters, vol. 5, No. 9, pp. 364-366 (Sep. 2001).

Hassibi, Babak "An Efficient Square-Root Algorithm for BLAST", IEEE International Conference on Acoustics, Speech, and Signal Processing, vol. 2, pp. 737-740 (2000).

Jang et al. "An Efficient Symbol-Level Combining Scheme for MIMO Systems With Hybrid ARQ", IEEE Transactions on Wireless Communications, vol. 8, pp. 2443-2451, May 26, 2009.

Jang et al., "Optimal Combining Schemes for MIMO Systems with Hybrid ARQ", ISIT 2007, IEEE International Symposium, Jun. 24-29, 2007, pp. 2286-2290.

Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).

Koike T., et al. "Hybrid ARQ scheme suitable for coded MIMO transmission" Communications, IEEE International Conference, Paris, France, pp. 2919-2923 (Jun. 20, 2004).

Krishnaswamy, Dilip, et al. "Multi-Level Weighted Combining of Retransmitted Vectors in Wireless Communications." *IEEE VTC.* Sep. 2006.

Liu, Peng et al. "A New Efficient MIMO Detection Algorithm based on Cholesky Decomposition," The 6th International Conference on Advanced Communication Technology, vol. 1, pp. 264-268 (2004).

Nagareda R et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).

(56) References Cited

OTHER PUBLICATIONS

Nakajima, Akinori et al. "Iterative Joint PIC and 2D MMSE-FDE for Turbo-coded HARQ with SC-MIMO Multiplexing" IEEE 63rd Vehicular Technology Conference, vol. 5, pp. 2503-2507 (May 2006).

Nakajima, Akinori et al. "Throuput of Turbo Coded Hybrid ARQ Using Single-carrier MIMO Multiplexing" IEEE 61st Vehicular Technology Conference, vol. 1, pp. 610-614 (2005).

Oh, Mi-Kyung et al. "Efficient Hybrid ARQ with Space-Time Coding and Low-Complexity Decoding" IEEE Conference on Acoustics, Speech, and Signal Processing, vol. 4, pp. 589-592 (2004).

Onggosanusi, Eko N. et al. "Hybrid ARQ Transmission and Combining for MIMO systems" *IEEE*, 2003.

Rontogiannis, Athanasios A. et al. "An Adaptive Decision Feedback Equalizer for Time-Varying Frequency Selective MIMO Channels" IEEE 7th Workshop on Selective MIMO Channels Signal Processing Advances in Wireless Communications, pp. 1-5 (Jul. 2006).

Samra H; Zhi Ding "New MIMO ARQ protocols and joint detection via sphere decoding" IEEE Transactions on Signal Processing [online], pp. 473-482 (Feb. 28, 2006).

Samra Harvino, Ding Zhi "Sphere decoding for retransmission diversity in MIMO flat-fading channels" ICASSP IEEE Int. Conf. Acoust. Speech Signal Process [online], pp. 585-588 (May 17, 2004).

Schmitt M. P. "Improved retransmission strategy for hybrid ARQ schemes employing TCM" Wireless Communications and Networking Conference, 1999 IEEE New Orleans, LA, pp. 1226-1228 (Sep. 21, 1999).

Theofilakos, Panagiotis et al. "Frobenius Norm Based Receive Antenna Subarray Formation for MIMO Systems" First European Conference on Antennas and Propagation, pp. 1-5 (2006).

Tirkkonen, O et al. "Square-Matrix Embeddable Space-Time Block Codes for Complex Signal Constellations," IEEE Trans. Info. Theory, vol. 48, pp. 384-395 (Feb. 2002).

Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).

Wolniansky, P.W. et al. "V-BLAST: An Architecture for Realizing Very High Data Rates Over the Rich-Scattering Wireless Channel", URSI International Symposium on Signals, Systems, and Electronics, pp. 295-300 (1998).

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.

Wübben, Dirk et al. "MMSE Extension of V-BLAST based on Sorted QR Decomposition" IEEE 58th Vehicular Technology Conference, vol. 1, pp. 508-512 (2003).

Zhang, Y. et al. "MMSE Linear Detector for Space-Time Transmit Diversity over Fast Fading Channels", The $14^{th}$ IEEE 2003 International Symposium on Personal, Indoor and Mobile Radio Communication Proceedings, pp. 2388-2392, 2003.

Zhou, S. et al., Subspace-Based (Semi-) Blind Channel Estimation for Block Precoded Space-Time OFDM, IEEE Transactions on Signal Processing, vol. 50, No. 5, May 2002, pp. 1215-1228.

\* cited by examiner

DISTANCE-LEVEL COMBINING FOR MIMO SYSTEMS WITH HARQ AND/OR REPETITION CODING

CROSS-REFERENCE TO RELATED APPLICATIONS

This application is a continuation of U.S. patent application Ser. No. 11/833,827, filed Aug. 3, 2007 (currently pending), which claims the benefit under 35 U.S.C. §119(e) of U.S. Provisional Application No. 60/821,773, filed Aug. 8, 2006, which are incorporated herein by reference in their entireties.

BACKGROUND OF THE INVENTION

This invention relates to a technique for decoding a received signal vector in a multiple-input multiple-output (MIMO) data transmission or storage system, where the receiver may receive multiple instances of the same transmitted signal vector.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and receiver, and of their respective components.

There are many strategies for designing the transmitter and receiver. When the channel characteristics are known, the transmitter and receiver often implement signal processing techniques, such as transmitter precoders and receiver equalizers, to reduce or remove the effects caused by the channel and effectively recover the transmitted signal. Intersymbol interference (ISI) is one example of a channel effect that may be approximately eliminated using signal processing.

However, not all sources of signal corruption are caused from deterministic sources such as ISI. Non-deterministic sources, such as noise sources, may also affect the signal. Due to noise and other factors, signal processing techniques may not be entirely effective at eliminating adverse channel effects on their own. Therefore, designers often add redundancy in the data stream in order to correct errors that occur during transmission. The redundancy added to the data stream is determined based on an error correction code, which is another design variable. Common error correction codes include Reed-Solomon and Golay codes.

One straightforward way to implement a code is to use forward error correction (FEC). The transmitter encodes the data according to an error correction code and transmits the encoded information. Upon reception of the data, the receiver decodes the data using the same error correction code, ideally eliminating any errors. Therefore, "decoding" is hereinafter referred to as a method for producing an estimate of the transmitted sequence in any suitable form (e.g., a binary sequence, a sequence of probabilities, etc.)

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). There are at least three standard HARQ protocols. HARQ type-I typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

HARQ type-II and type-III are different from HARQ type-I, because the data sent on retransmissions of a packet are not necessarily the same as the data that was sent originally. HARQ type-II and type-III utilize incremental redundancy in successive retransmissions. That is, the first transmission uses a code with low redundancy. The code rate of a code is defined as the proportion of bits in the vector that carry information and is a metric for determining the throughput of the information. Therefore, the low redundancy code used for the first transmission of a packet has a high code rate, or throughput, but is less powerful at correcting errors. If errors are detected in the first packet, the second transmission is used to increase the redundancy, and therefore the error correcting capability, of the code. For example, if the first transmission uses a code with a code rate of 0.80, a retransmission may add enough extra redundancy to reduce the overall code rate to 0.70. The redundancy of the code may be increased by transmitting extra parity bits or by retransmitting a subset of the bits from the original transmission. If each retransmission can be decoded by itself, the system is HARQ type-III. Otherwise, the system is HARQ type-II.

SUMMARY OF THE INVENTION

Systems and methods for reliable transmission in multiple-input multiple-output systems are disclosed, where a receiver obtains multiple signal vectors from the same transmit signal vector and combines them prior to decoding.

The transmitter, which has $N_t$ outputs, may send an $N_t$-dimensional signal vector to the receiver. The receiver, which has $N_r$ inputs, may receive an $N_r$-dimensional signal vector corresponding the $N_t$-dimensional transmit vector. In accordance with one aspect of the invention, the transmitter sends the same signal vector multiple times to the receiver according to some protocol. Two protocols that may be used are HARQ type-I and repetition coding, or a combination of the two.

The receiver can utilize information from multiple transmissions of the signal vector. This can be beneficial, because even packets that contain errors carry some amount of information about the transmitted information. However, due to system complexity, and in particular decoder complexity, many practical schemes only use data from a small, fixed number of transmissions. Therefore, the present invention provides systems and methods for effectively utilizing information from an arbitrary number of transmitted signal vectors that does not significantly increase the complexity of the system.

In one embodiment of the present invention, when the receiver has N≥1 received signal vectors corresponding to a common transmit signal vector, the receiver may calculate a set of measures for each of the N received signal vectors. The set of measures may be calculated using a decoding metric, where the decoding metric may be a distance-based function. Thus, these measures may be referred to as distances. For any given received signal vector, each measure in a set is associated with a possible value of the common transmit signal vector. Also, each measure in the set may roughly correspond to the likelihood that its associated possible transmit signal vector is the true transmitted signal vector. Therefore, each received signal vector has information, in the form of these measures, on the likelihood of each possible transmitted signal vector.

The N sets of distances may be combined to produce a single set of combined distances. In particular, distances from each set that correspond to the same possible transmit signal vector may be combined. Thus, the single set of combined distances may have information on the likelihood that each possible transmit signal vector corresponds to the actual value of the common transmit signal vector, where this information may take into account the information from all received signal vectors. This set of information may therefore be referred to as a set of likelihood measures. The set of likelihood measures may then be used to determine which of the possible transmit signal vectors is the actual common transmit signal vector. For example, the set of combined distances may be used to compute a log-likelihood ratio for each bit in the transmitted sequence.

In some embodiments, such as when an ARQ or HARQ protocol is used, the multiple receptions of a common transmit signal vector may occur in distinct time intervals. Therefore, the receiver may include a storage system to store results from computations performed after each time interval. These results may then be utilized when more signal vectors are received in later time intervals. For example, a storage system may be used to store the set of combined distances for all signal vectors that have been received thus far. When a new set of signal vectors is received, newly calculated sets of distances associated with the newly received set of signal vectors may be combined with the set of combined distances stored in the storage system. Therefore, an updated set of combined distances with all available information may be obtained without recomputing distances from previous receptions. The updated set of combined distances may be stored and used again if another set of signal vectors is received.

In some embodiments, the received signal vectors may be processed before the decoding metric is evaluated. The signal vectors may be processed in order to reduce the complexity or number of computations necessary to evaluate the decoding metric. In some embodiments, processing the signal vectors allows the distance calculation of the decoding metric to be less computationally expensive. In other embodiments, processing the signal vectors may allow a different, less complex distance calculation (e.g., a linear calculation) to be implemented. Because the decoding metric may be repeatedly evaluated, simplifying the evaluation of a distance calculation may result in significant complexity reduction.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION

The disclosed invention provides a technique in a multiple-input multiple-output data transmission or storage system to decode a signal vector at a receiver, where the receiver may receive multiple signal vectors from the same transmitted signal vector.

Figure 1:
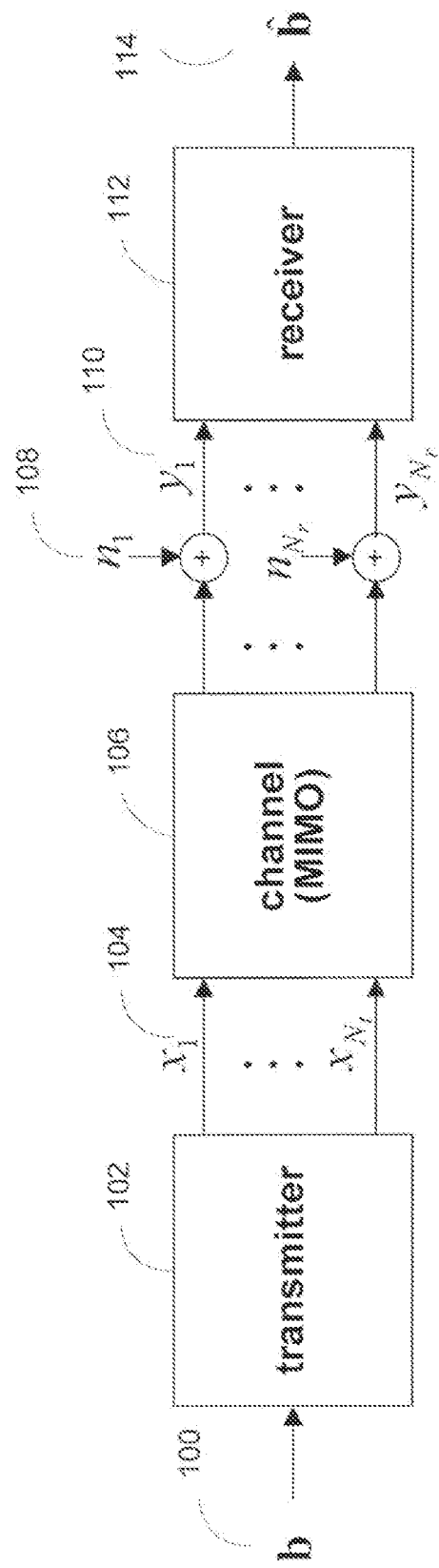
FIG. 1 is a high level block diagram of a multiple-input multiple-output (MIMO) data transmission or storage system.

FIG. 1 shows an illustration of a basic data transmission or storage system in accordance with one embodiment of the present invention. Data, typically grouped into packets, is sent from transmitter 102 to receiver 112. During transmission, the signals may be altered by a transmission medium, represented by channel 106, and additive noise sources 108. Transmitter 102 has $N_t$ outputs 104 and receiver 112 has $N_r$ inputs 110, so channel 106 is modeled as a multiple-input multiple-output (MIMO) system with $N_t$ inputs and $N_r$ outputs. The $N_t$ input and $N_r$ output dimensions may be implemented using multiple time, frequency, or spatial dimensions, or any combination of such dimensions.

Figure 2:
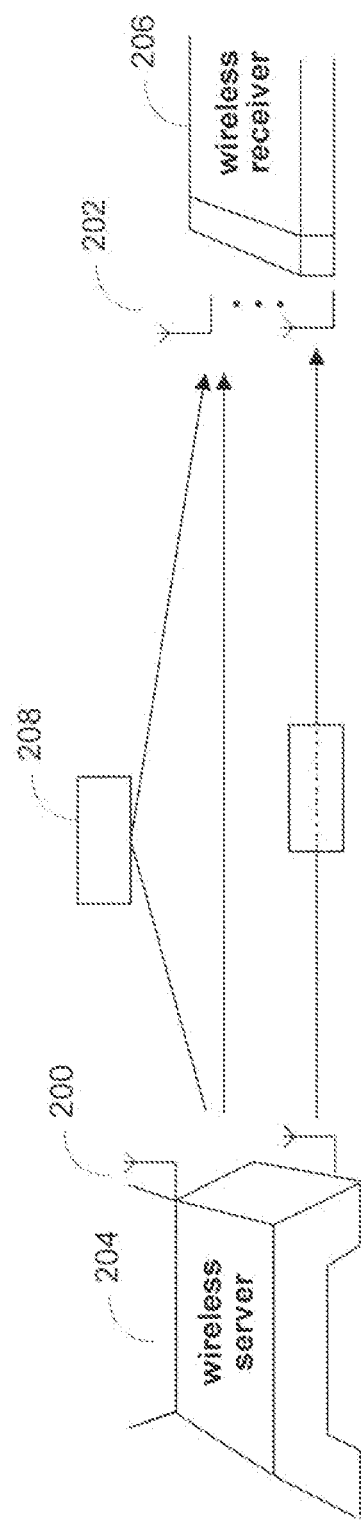
FIG. 2 is a wireless transmission system in accordance with one embodiment of the system in FIG. 1.

In one embodiment, FIG. 1 represents a wireless communication system, pictured in FIG. 2. In this embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least multipath fades and shadowing effects. Typically, wireless communication systems use spatial dimensions to implement multiple dimensions in the form of multiple transmitting antennas 200 and receiving antennas 202.

Returning to FIG. 1, transmitter 102 prepares bit sequence 100 into signals capable of transmission through channel 106. For an uncoded system, bit sequence 100 is a binary message, where the message carries only information bits. Alternatively, for a coded system, bit sequence 100 may be an encoded version of the message. Thus, bit sequence 100 may have originated from a binary data source or from the output of a source encoder (not pictured).

Figure 3:
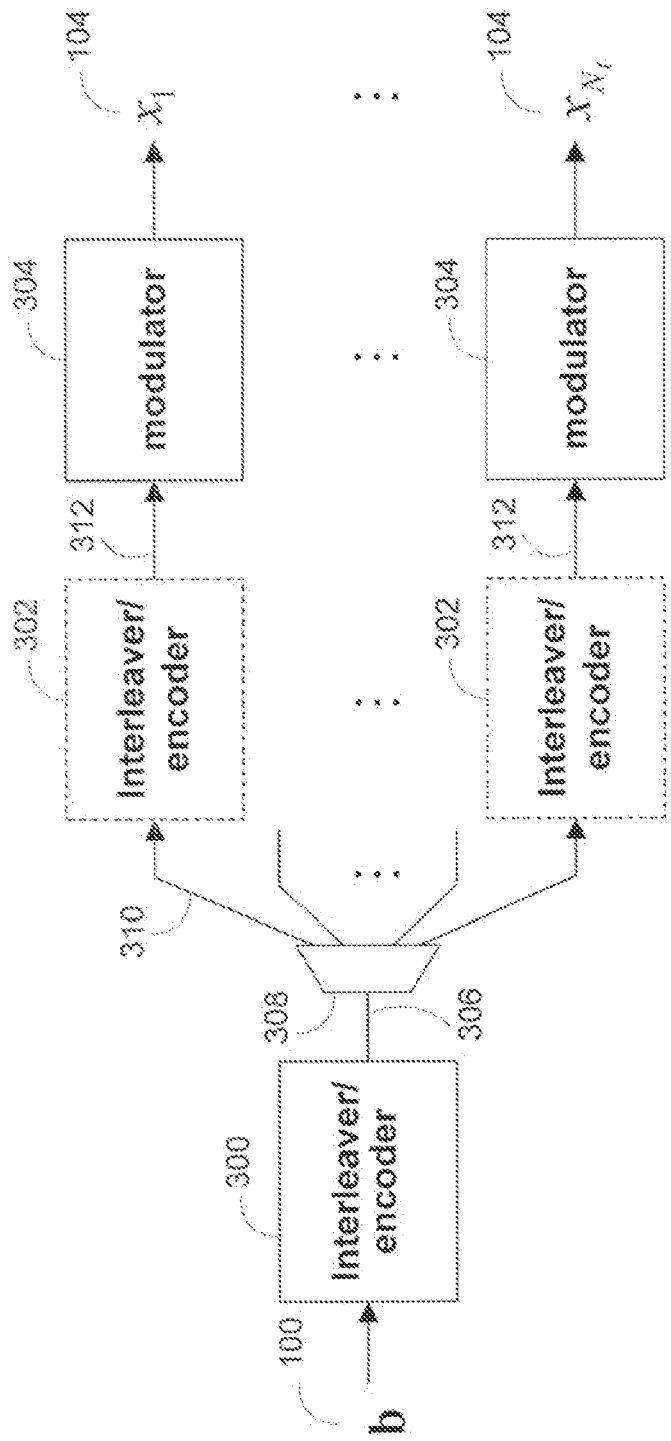
FIG. 3 is a block diagram of a transmitter.

One embodiment of transmitter 102 is shown in FIG. 3. Transmitter 102 converts bit sequence 100 into signals 104 appropriate for transmission through channel 106 (FIG. 1). Bit sequence 100 is passed through interleaver/encoder 300, which may interleave and/or encode bit sequence 100. If interleaver/encoder 300 performs encoding, the encoding may be based on any suitable error control code (e.g., convolutional, block, error-detecting, error correcting, etc.). By interleaving bit sequence 100, each bit in the resulting bit sequence may be assumed to be independent of all other bits in the bit sequence. Bit sequence 306 at the output of interleaver/encoder 300 is demultiplexed by demultiplexor 308 across $N_t$ paths 310. Each demultiplexed output 310 may or may not go through another interleaver and/or coding block 302, yielding bit sequences 312. Finally, bit sequences 312 are modulated with modulators 304, and are transmitted as signals $x_1, \ldots, x_{N_t}$, or x in vector form.

Figure 4A:
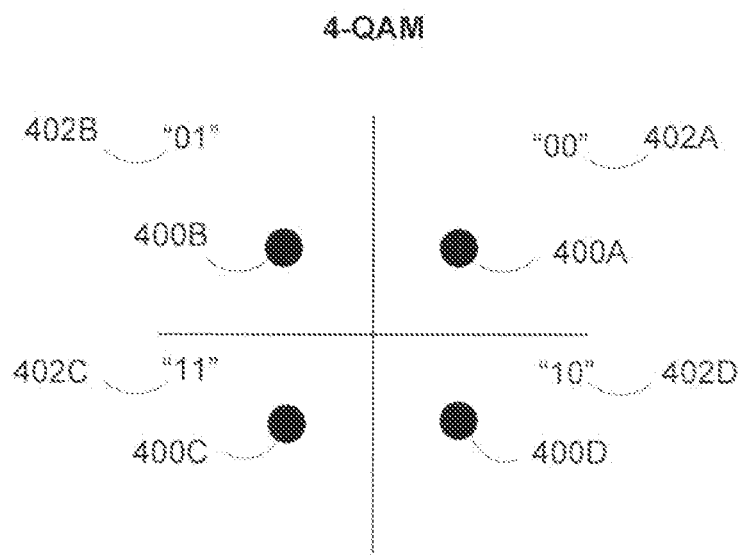
FIG. 4A is a signal constellation set for quadrature amplitude modulation with four signal points.

Modulators 304 group the incoming bits into symbols, which are mapped and converted to signals according to a signal constellation set and carrier signal. In one embodiment of the invention, modulator 304 uses quadrature amplitude modulation (QAM). Each symbol is mapped to a signal point in the QAM signal constellation set, where the signal points are differentiated from one another by phase and/or magnitude. For example, FIG. 4A shows a 4-QAM signal constellation set in a complex number plane. In this case, signal points 400A-400D are distinguishable only by phase. Each signal point represents a different two-bit symbol 402: 400A represents "00," 400B represents "01," 400C represents "11," and 400D represents "10." However, any other one-to-one mapping from symbol to signal point is valid.

Figure 4B:
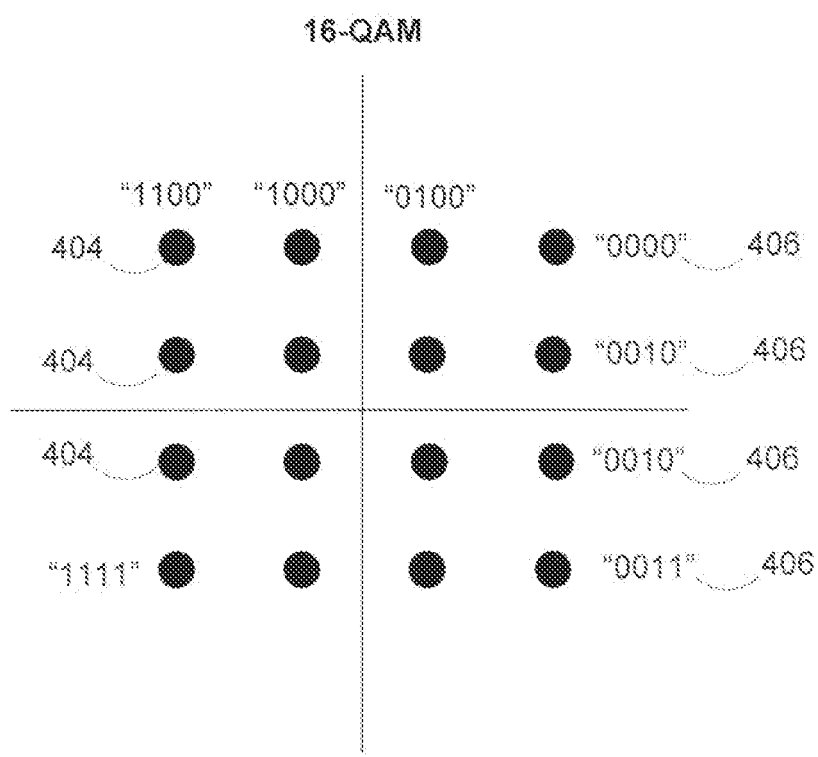
FIG. 4B is a signal constellation set for quadrature amplitude modulation with 16 signal points.

FIG. 4B shows a 16-QAM signal constellation set, where four-bit sequences 406 are combined into one symbol. Here, both the amplitudes and the phase of signal points 404 may vary. FIG. 4B shows a partial mapping from symbols 406 to signal points 404, where the each symbol is shown closest to its corresponding signal point. However, as before, any other mapping is possible. In general, an m-bit symbol may be mapped according to an M-QAM signal set, where $M=2^m$. Therefore, for the transmitter configuration shown in FIG. 3, transmitter 102 is capable of transmitting $mN_t$ bits concurrently.

In accordance with one embodiment of the present invention, transmitter 102 sends the same vector, x, multiple times according to a protocol that is also known and followed by receiver 112. Depending on the protocol, there may be additional components in transmitter 102 that are not shown in FIG. 3. It should be understood that transmitter 102 may be altered in order to implement such protocols. For example, if an automatic repeat request (ARQ) protocol is used, transmitter 102 may need a buffer to store x, or equivalently bit stream 100, in the event that a retransmission is requested.

Even though x is transmitted, receiver 112 in FIG. 1 actually receives $y_i$, where $$y_i = H_i x + n_i, \quad 1 \leq i \leq N \tag{1}$$

Figure 5:
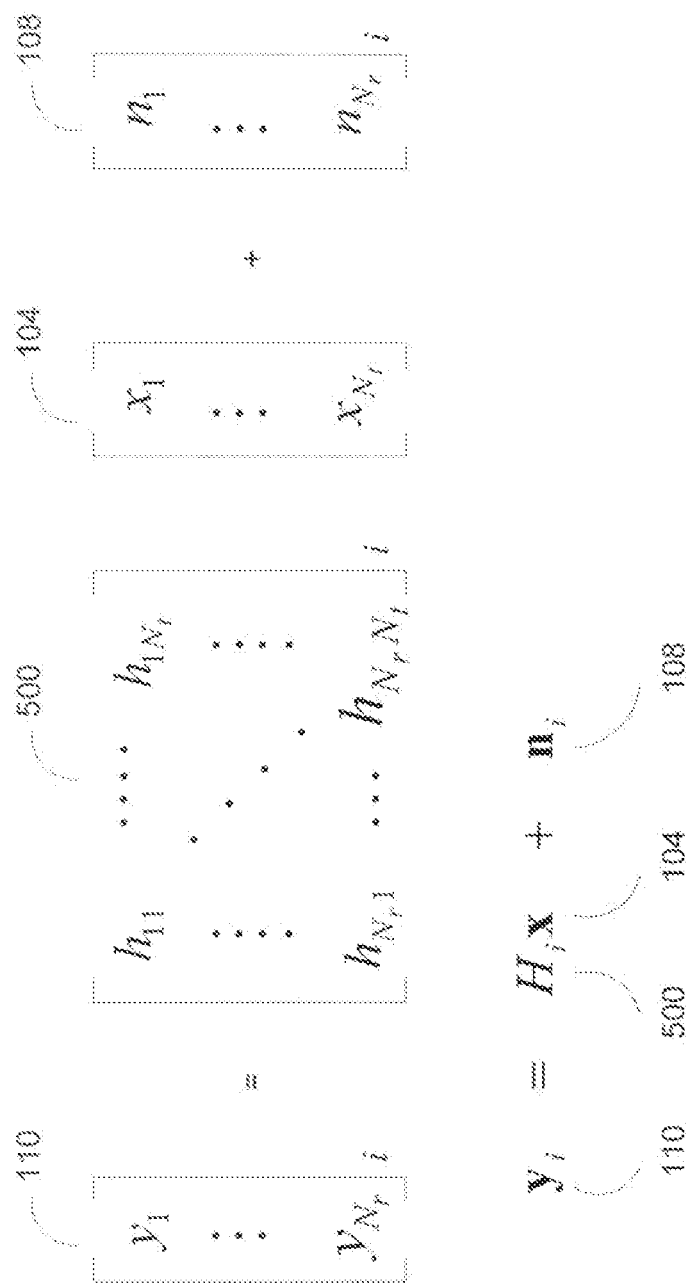
FIG. 5 is a vector model of the system in FIG. 1.

For clarity, FIG. 5 shows the components of each vector in equation (1). Index i represents the ith instance that the same transmitted vector, x, is transmitted. $y_i$ is an $N_r \times 1$ vector, where each vector component is the signal received by one of the $N_r$ inputs of receiver 112. $H_i$ 500 is an $N_r \times N_t$ channel matrix that defines how channel 106 alters the transmitted vector, x. $n_i$ is an $N_r \times 1$ vector of additive noise. Note that the characteristics of channel 106, reflected in matrix 500, and noise sources 108, and therefore received signal 110, may be different for each instance i. Differences arise because each transmission of x occurs at a different time or through a different medium.

In one embodiment, noise sources 108 may be modeled by receiver 112 as additive white Gaussian noise (AWGN) sources. In this case, noise sources 108 are independent and identically distributed (i.i.d.). That is, the noise that affects any of the $N_r$ components in any $n_i$ does not affect the noise for any other component in $n_i$, and the noise for a component in $n_i$ at any given time does not affect the noise at any other time. Also, each component of $n_i$ has zero mean and is random in terms of both magnitude and phase, where the magnitude and the phase are also independent. This type of noise source is called an i.i.d. zero mean circularly symmetric complex Gaussian (ZMCSCG) noise source. If the variance of each component is $N_0$, then the conditional probability distribution function (pdf) of the received signal, $Pr\{y|x,H\}$, is given by $$Pr\{y \mid x, H\} = \frac{1}{(\pi N_0)^N} \exp\left\{-\frac{\|y - Hx\|^2}{N_0}\right\} \tag{2}$$

Equation (2) will be used with reference to optimal decoding in equations (4) through (9) below.

Receiver 112 may use one or more of the N received copies of x to determine the information that was transmitted. Receiver 112 may combine information about multiple received vectors before decoding, thereby utilizing more than one, and possibly all, of the information available in the received signal vectors. The combining scheme disclosed in the present invention will be discussed in greater detail below in connection with FIGS. 8 and 9. It should be understood that the receiver in the present invention may utilize all received signal vectors. Alternatively, information about a subset of the received signal vectors and channel matrices may be used. For example, a received signal vector and its corresponding channel matrix may be discarded if the magnitude of a component in the received signal vector is below a certain threshold. Thus, the variable N should refer to the number of received signal vectors used by the receiver, which is not necessarily the same as the number of total signal vectors received.

Figure 6A:
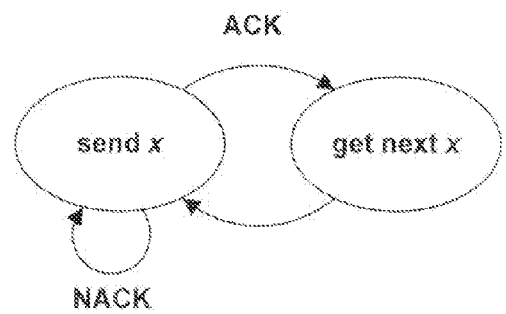
FIG. 6A is a flow diagram of a stop-and-wait HARQ transmitter.
Figure 6B:
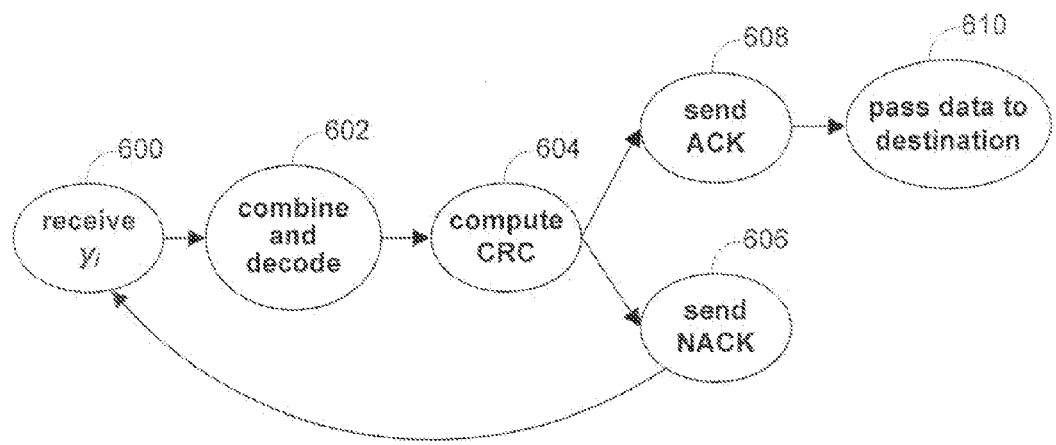
FIG. 6B is a flow diagram of a HARQ receiver.

In one embodiment of the invention, receiver 112 receives multiple instances of a common transmit vector using a retransmission protocol. For example, the transmitter and receiver may use a HARQ type-I protocol. The flow chart of the steps taken by transmitter 102 and receiver 112 are shown in FIG. 6A and FIG. 6B, respectively. FIG. 6A shows a transmitter following a stop-and-wait protocol, where the transmitter waits until a signal vector has been accepted by the receiver before sending the next signal vector. Other protocols, such as go-back-N, selective repeat, or any other suitable protocol may be used in place of stop-and-wait. Therefore, it should be understood that FIG. 6A may be modified in order to implement a different protocol.

FIG. 6B shows a simplified flow chart of a HARQ type-I receiver protocol in accordance with one embodiment of the invention. At some time, receiver 112 receives $y_i$ at step 600, corresponding to the ith transmission of x. At step 602, receiver 112 combines information from all received vectors, $y_1, \ldots, y_i$, corresponding to transmitted signal x. Prior to combining the vectors, receiver 112 may also process the received signal vectors such that the receiver combines information from processed versions of the received signal vectors. Receiver 112 may utilize the combined information in order to perform decoding. In FIG. 6B, decoding refers to determining the CRC-protected message based on the combined signal vector. Other possible decoding outputs will be discussed in greater detail below in connection with FIG. 8. Errors in individual signal vectors may be corrected by combining the information from multiple signal vectors such that the combined information is correctable. Following decoding, error detection may be performed at step 604, which in this case involves checking the CRC of the decoded vector. If errors are detected, the receiver may send a negative acknowledgement (NACK) message to the transmitter at step 606. Upon receipt of the NACK, the transmitter may send the same transmitted signal vector, which is received at step 600 as $y_{i+1}$, $y_{i+1}$ may be different from $y_i$ even though the same transmit signal vector x is used at the transmitter, because $y_{i+1}$ is transmitted at a later time than $y_i$ and is affected by different noise and/or channel characteristics. The i+1 vectors may then be combined and decoded, as described previously. This procedure occurs N times, until by combining and decoding N received vectors, no CRC error is detected. At this point, the receiver sends an acknowledgment (ACK) message at step 608 back to the transmitter to inform the transmitter that the vector has been successfully received. Also, since there are no errors in the decoded data, the receiver passes the decoded data to the destination at step 610.

In another embodiment of the invention, the transmitter sends a signal vector, x, a predetermined number of times, irrespective of the presence of errors. For example, the receiver may obtain N transmissions of x from repetition coding. N copies of x may be transmitted simultaneously, or within some interval of time. The receiver may utilize information from the N received signal vectors, $y_1, \ldots, y_N$, or equalized versions of the received signal vectors, and may perform decoding based on the combined information. Repetition coding may be useful when there is no feasible back-channel for the receiver to send retransmission requests.

HARQ type-I and repetition coding are two protocols that may be used in different embodiments of the present invention. Alternatively, repetition coding and HARQ can be combined such that multiple vectors are received at step 600 before combining and decoding at step 602. The invention, however, is not limited to the two protocols and their combination mentioned here. Currently, the IEEE 802.16e standard uses HARQ and repetition coding, so these particular protocols merely illustrate embodiments of the invention. It should be understood that any protocol that allows the receiver to receive multiple copies of the same transmitted vector falls within the scope of the present invention.

In addition to implementing a protocol for receiving multiple signal vectors, receiver 112 (FIG. 1) may also decode the received signal vectors to recover the common transmit signal vector, x. Receiver 112 may return soft information or hard information corresponding to x. If the decoder returns hard information, it may be the result of mapping soft information into hard information. For example, receiver 112 may compute soft information for each bit in the transmitted sequence in the form of a log-likelihood ratio (LLR), where the sign of each LLR indicates the most likely value of the transmitted bit (e.g., most likely '1' if positive, most likely '0' if negative), and the magnitude of each LLR indicates the strength or confidence of the decision. Therefore, receiver 112 may compute an LLR for each bit and then map each LLR to a hard decision based on the sign of the LLR. Alternatively, receiver 112 may compute an LLR for each bit and then provide the soft information to a soft decoder (e.g., an LDPC decoder, etc.). Therefore, for a coded system, receiver 112 may return coded information or decoded information.

To compute an LLR for each bit, $b_\lambda$, in the transmitted sequence, receiver 112 (FIG. 1) may compute $$LLR_{DLC-ML} = \min_{\hat{x}^{(0)} \in X_\lambda^{(0)}} \left\{ \sum_{i=1}^{N} \|y_i - H_i\hat{x}^{(0)}\|^2 \right\} - \min_{\hat{x}^{(1)} \in X_\lambda^{(1)}} \left\{ \sum_{i=1}^{N} \|y_i - H_i\hat{x}^{(1)}\|^2 \right\}. \quad (3)$$

Figure 7A:
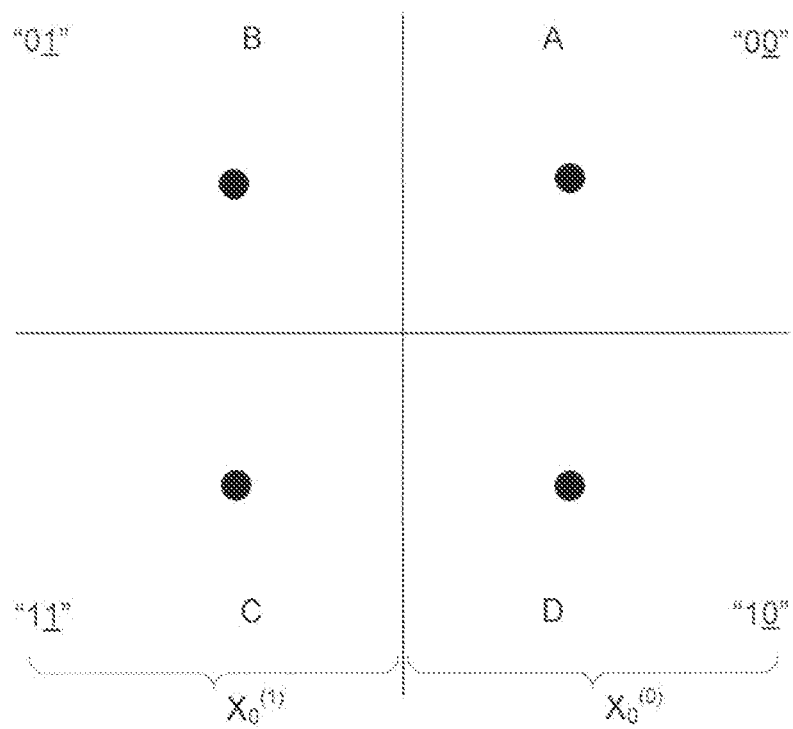
FIGS. 7A-7B show subsets of signal points in a 4-QAM signal constellation set.
Figure 7B:
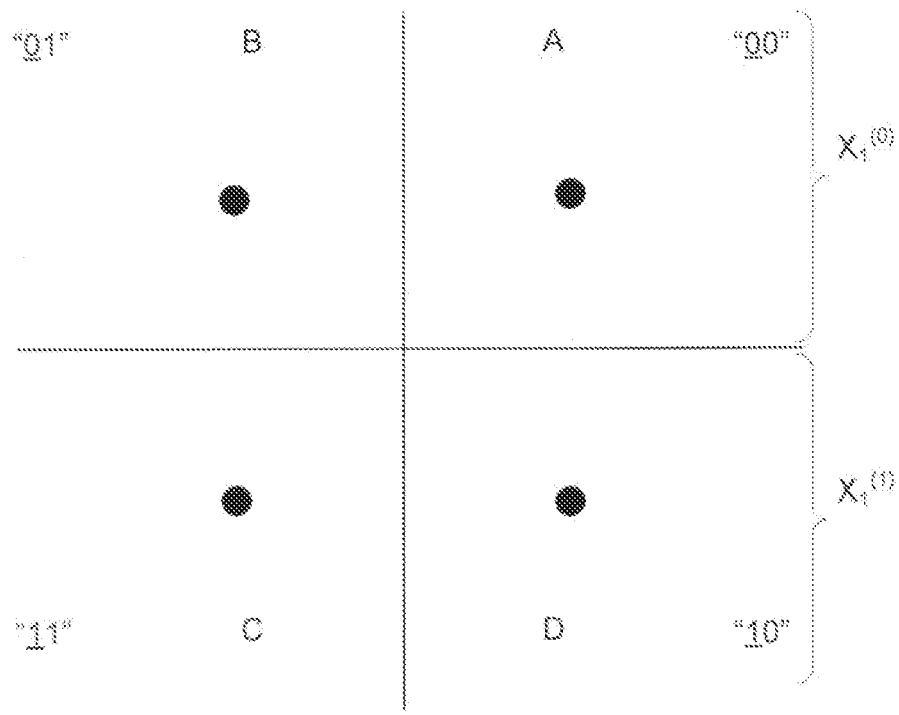

The variable $X_\lambda^{(j)}$ in equation (3) denotes a subset of the signal constellation set whose $\lambda^{th}$ bit equals j for j=0,1. For example, FIGS. 7A and 7B illustrate the four possible symbol subsets for the 4-QAM signal constellation set discussed above in connection with FIG. 4A. The symbol subsets can then be extended to different possible transmit signal vectors, $\hat{x}$, that include these symbols subsets. In each of FIGS. 7A and 7B, the $\lambda^{th}$ bit is underlined for emphasis. Note that, as is consistent with the definition of the subset, the emphasized bit is the same for all members of a subset. Thus, the signal point in quadrant A belongs in subsets $X_0^{(0)}$ and $X_1^{(0)}$. Similarly, the signal point in quadrant B belongs in subsets $X_0^{(1)}$ and $X_1^{(0)}$, etc. Therefore, the first minimization function in equation (3) minimizes across all symbols where $b_\lambda=0$, and the second minimization function in equation (3) minimizes across all symbols where $b_\lambda=1$.

As derived below in equations (4)-(11), equation (3) is a nearly optimal LLR equation for N received signal vectors. Thus, because receiver 112 may implement equation (3) and may therefore have nearly optimal decoding performance, receiver 112 may be referred to as a nearly optimal receiver. An optimal receiver is hereinafter defined to be one that, given N received signal vectors, chooses the signal vector that has the highest probability of being the actual transmit signal vector in the presence of AWGN. This is considered optimum, because all information from the N received signals is used fully utilized. A truly optimal receiver would compute an LLR given by equation (9) below, which may be derived as follows:

$$LLR_{opt} = L(b_\lambda \mid y_1, \ldots, y_N, H_1, \ldots, H_N \quad (4)$$

$$= \ln \frac{Pr\{b_\lambda = 1 \mid y_1, \ldots, y_N, H_1, \ldots, H_N\}}{Pr\{b_\lambda = 0 \mid y_1, \ldots, y_N, H_1, \ldots, H_N\}} \quad (5)$$

$$= \ln \frac{\sum_{\hat{x}^{(1)} \in X_\lambda^{(1)}} Pr\{y_1, \ldots, y_N \mid \hat{x}^{(1)}, H_1, \ldots, H_N\}}{\sum_{\hat{x}^{(0)} \in X_\lambda^{(0)}} Pr\{y_1, \ldots, y_N \mid \hat{x}^{(0)}, H_1, \ldots, H_N\}} \quad (6)$$

$$= \ln \frac{\sum_{\hat{x}^{(1)} \in X_\lambda^{(1)}} \prod_{i=1}^{N} Pr\{y_i \mid \hat{x}^{(1)}, H_i\}}{\sum_{\hat{x}^{(0)} \in X_\lambda^{(0)}} \prod_{i=1}^{N} Pr\{y_i \mid \hat{x}^{(0)}, H_i\}} \quad (7)$$

-continued $$= \ln \frac{\sum_{\hat{x}^{(1)} \in X_\lambda^{(1)}} \prod_{i=1}^{N} \frac{1}{\pi^{N_r}} \exp\{-\|y_i - H_i \hat{x}^{(1)}\|^2\}}{\sum_{\hat{x}^{(0)} \in X_\lambda^{(0)}} \prod_{i=1}^{N} \frac{1}{\pi^{N_r}} \exp\{-\|y_i - H_i \hat{x}^{(0)}\|^2\}} \quad (8)$$

$$= \ln \frac{\sum_{\hat{x}^{(1)} \in X_\lambda^{(1)}} \exp\left\{-\sum_{i=1}^{N} \|y_i - H_i \hat{x}^{(1)}\|^2\right\}}{\sum_{\hat{x}^{(0)} \in X_\lambda^{(0)}} \exp\left\{-\sum_{i=1}^{N} \|y_i - H_i \hat{x}^{(0)}\|^2\right\}} \quad (9)$$

Equations (4) and (5) follow from the known definition of the LLR. Equation (6) is reached by applying Bayes' Theorem, a technique known in the art, and by writing the equation in terms of different possible transmitted signal vectors, $\hat{x}$, that include bit $b_\lambda$. That is, rather than writing an equation in terms of $b_\lambda = 0$ and $b_\lambda = 1$, as shown in equation (5), it may be written in terms of subsets $X_\lambda^{(0)}$ and $X_\lambda^{(1)}$, as discussed above and illustrated in FIGS. 7A and 7B. Equation (7) follows from the independence of each received signal vector. Finally, equations (8) and (9) result from plugging in equation (2) for the conditional probabilities. Recall that equation (2) is the conditional probability distribution function (PDF) for an AWGN channel.

The division operation, the summations over exponential functions, and the natural logarithm calculation in equation (9) are complex calculations. Thus, the LLR computation may be simplified by applying an approximation, $\Sigma_i \log a_i \approx \log \max_i a_i$. Accordingly, a nearly optimal LLR may be given by, $$LLR_{opt} \simeq \ln \frac{\max_{\hat{x}^{(1)} \in X_\lambda^{(1)}} \exp\left\{-\sum_{i=1}^{N} \|y_i - H_i \hat{x}^{(1)}\|^2\right\}}{\max_{\hat{x}^{(0)} \in X_\lambda^{(0)}} \exp\left\{-\sum_{i=1}^{N} \|y_i - H_i \hat{x}^{(0)}\|^2\right\}} \quad (10)$$

$$= \min_{\hat{x}^{(0)} \in X_\lambda^{(0)}} \left\{\sum_{i=1}^{N} \|y_i - H_i \hat{x}^{(0)}\|^2\right\} - \min_{\hat{x}^{(1)} \in X_\lambda^{(1)}} \left\{\sum_{i=1}^{N} \|y_i - H_i \hat{x}^{(1)}\|^2\right\}. \quad (11)$$

Thus, equation (11) approximately chooses an $\hat{x}$ that maximizes the probability of being the actual common transmit signal vector. Accordingly, a receiver (e.g., receiver 112) that implements equation (11), or equivalently equation (3), is essentially a receiver with a maximum-likelihood decoder evaluating a decoding metric of $\|y - H\hat{x}\|^2$.

Figure 8:
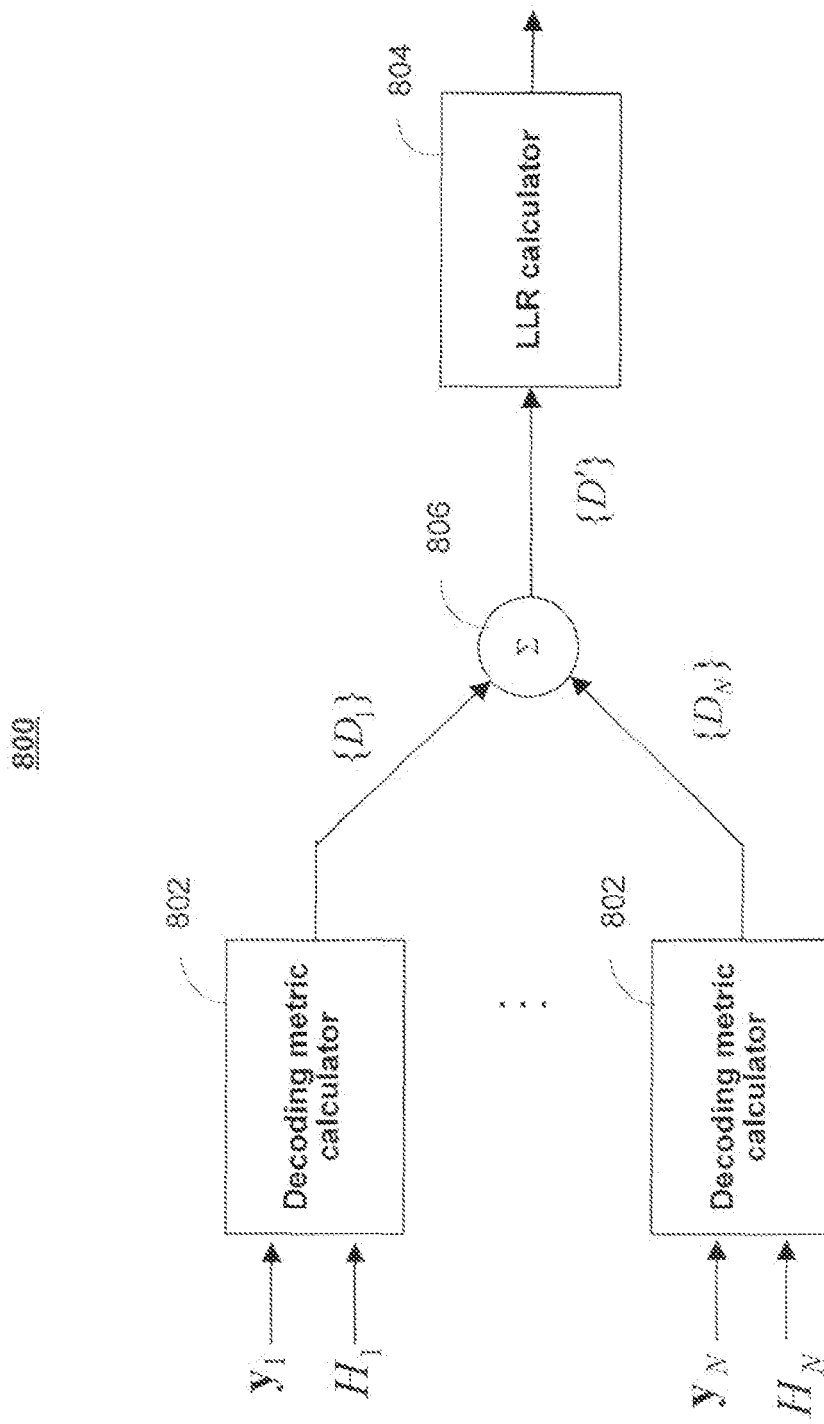
FIGS. 8-9 show high level block diagrams of receivers for MIMO systems.

FIG. 8 shows block diagram 800 of a receiver (e.g., receiver 112 in FIG. 1) that includes decoding metric calculators 802, combiner 806, and LLR calculator 804. Block diagram 800 may be used to compute a nearly optimal LLR, such as the LLR given by equation (11). First, information about each of the N received signal vectors may be obtained by decoding metric calculators 802. Each decoding metric calculator may use a received signal vector, $y_i$, and associated channel information (e.g., channel matrix $H_i$) to compute a set of informational measures using a decoding metric. Thus, decoding metric calculators 802 may produce N sets of informational measures: one for each $y_i$. Each measure in a set may be associated with a different possible value of x, where x is the $mN_t$-sized common transmit bit sequence. Therefore, a set of measures may include up to $2^{mN_t}$ or more measures.

In some embodiments, decoding metric calculators 802 may implement $\|y - H\hat{x}\|^2$, the decoding metric associated with the near-optimal LLR equation shown above as equation (11). In these embodiments, for a given received signal vector, $y_i$, and associated channel response matrix, $H_i$, one of decoding metric calculators 802 may obtain a set of measures by evaluating $\|y_i - H_i \hat{x}\|^2$ for each valid value of $\hat{x}$. Note that $\|y_i - H_i \hat{x}\|^2$ is essentially a distance calculation. Therefore, a decoding metric evaluated with a particular $\hat{x}$ will hereinafter be referred to as a distance, denoted as D. For convenience, a set of distances for a signal vector, $y_i$, will be denoted as $\{D\}_i$.

Each of decoding metric calculators 802 may compute a set of distances using any suitable technique. In some embodiments, calculators 802 may only compute one distance at a time, and may therefore have a small amount of hardware. Thus, calculating a full set of distances may take a significant amount of time to complete. In other embodiments, a decoding metric calculator may be able to compute many distances at a time. In these embodiments, calculators 802 may have more circuitry, but may compute a set of distances faster. Thus, the speed and complexity of decoding metric calculators may be adjusted according to, for example, the size or speed requirements of the receiver.

After obtaining N sets of distances, for signal vectors $y_1, \ldots, y_N$, combiner 806 may combine distances from different sets (e.g., a distance from each of $\{D\}_1, \ldots, \{D\}_N$) to form a single set of combined distances, or likelihood measures, referred to as $\{D'\}$. To combine the sets in a manner consistent with computing the near optimal LLR of equation (11), combiner 806 may combine distances from different sets that are associated with the same value of $\hat{x}$, and may combine these distances using unweighted addition. Thus, the resulting set of combined distances may include a combined distance for each valid value of $\hat{x}$, where each combined distance may equal $\Sigma_{i=1}^{N} \|y_i - H_i \hat{x}\|^2$. Although combiner 806 is an adder in FIG. 8, it should be understood that combiner 806 may combine distances using any other function, such as using weighted addition. Also, combiner 806 may combine the sets in a manner other than that described above.

LLR calculator 804 in FIG. 8 may use the set of combined distances produced by combiner 806 to compute a soft estimate of each bit, $b_\lambda$, of the common transmit signal vector. In some embodiments, LLR calculator 804 may compute a soft estimate in the form of an LLR for each bit of the transmitted bit sequence. For each bit, $b_\lambda$, LLR calculator 804 may separate the set of combined distances, $\{D'\}$, into those associated with a value of $\hat{x}$ where bit position, $b_\lambda$, is equal to zero (which is the set $X_\lambda^{(0)}$), and those associated with a value of $\hat{x}$ where $b_\lambda$ is equal to one (which is the set $X_\lambda^{(1)}$). LLR calculator 804 may then determine which of the combined distances in each group is the smallest distance of the group. Thus, for each bit $b_\lambda$, LLR calculator 804 may reduce the set of combined distances to two relevant combined distances:

$$\min_{\hat{x}^{(0)} \in X_\lambda^{(0)}} \left\{\sum_{i=1}^{N} \|y_i - H_i \hat{x}^{(0)}\|^2\right\}; \quad (1)$$

the smallest combined distance for a particular value of $\hat{x}$ where $b_\lambda=1$, and $$\min_{\hat{x}^{(1)} \in X_\lambda^{(1)}} \left\{ \sum_{i=1}^{N} \|y_i - H_i \hat{x}^{(1)}\|^2 \right\}; \quad (2)$$

the smallest combined distance for a particular value of $\hat{x}$ where $b_\lambda=0$. Finally, LLR calculator 804 may take the difference of the two minimizing distances to obtain equation (11), the nearly optimal LLR equation. Therefore, using the decoding scheme of FIG. 8, a receiver (e.g., receiver 112) may have close to the performance of an optimal receiver.

It should be understood that calculator 804 may obtain an estimate of the common transmit signal vector in any suitable way, and may not calculate LLRs. For example, calculator 804 may output a hard estimate of the transmit signal vector by choosing the $\hat{x}$ associated with the smallest combined distance in $\{D'\}$.

The receiver illustrated in FIG. 8 shows all N received vectors and N channel response matrices as inputs into their respective decoding metric calculators. However, not all N signal vectors and N channel matrices are necessarily provided to the calculators at the same time, and the receiver is not required to wait until after all N signal vectors are received to begin operating. Instead, the receiver shown in FIG. 8 merely illustrates that the system is capable of combining information from all N transmissions of a common transmit signal vector in any suitable manner. In fact, in some embodiments, such as when a HARQ protocol is used, the combiners may only need to accept one signal vector or channel matrix at any given time, and information on the previous transmissions may be obtained from some other source.

Figure 9:
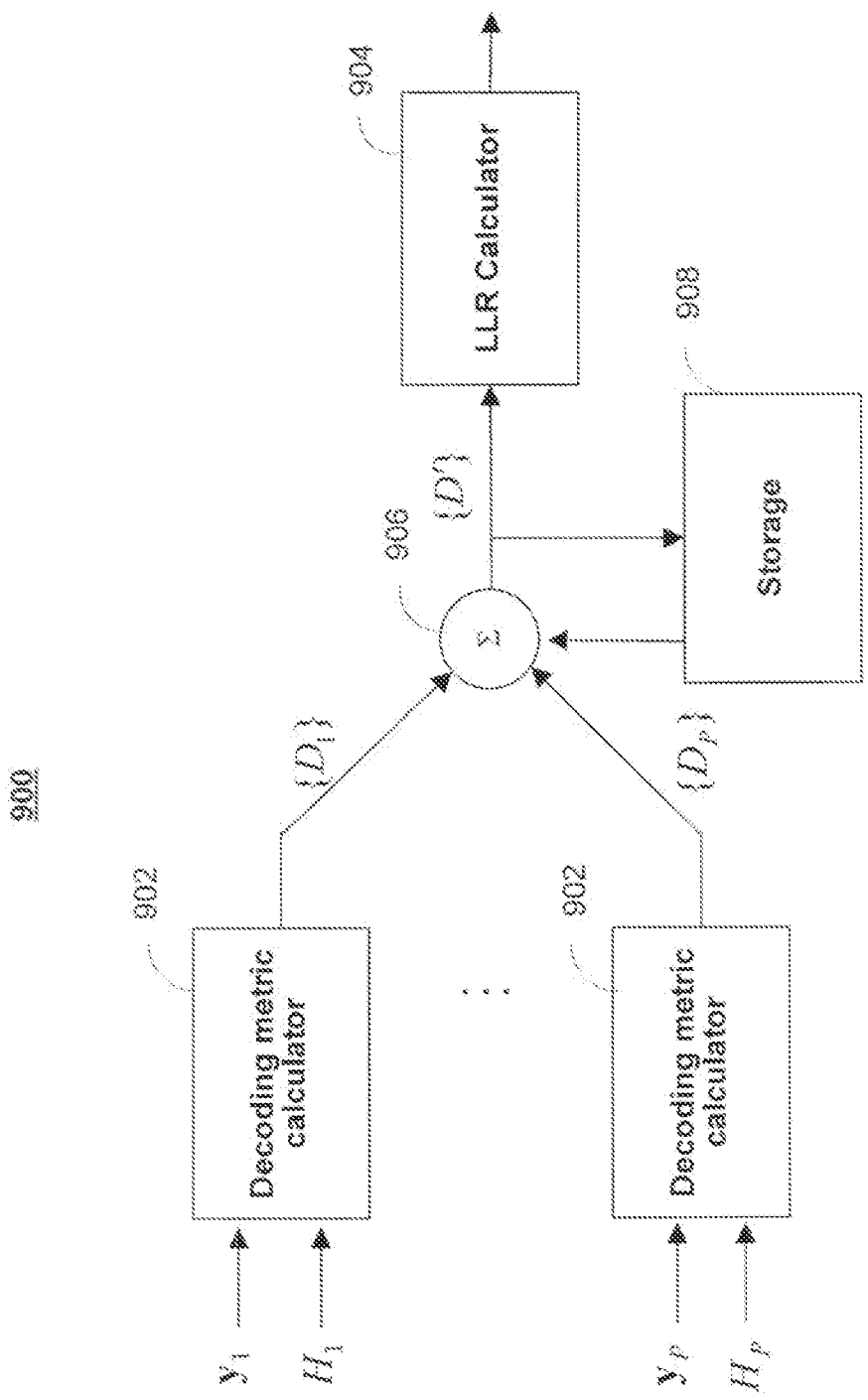

FIG. 9 shows a receiver using a similar configuration as FIG. 8, but with an extra storage system for storing a set of combined distances. In block diagram 900 of FIG. 9, the N signal vectors are received in groups of P signal vectors, where $1<P\leq N$. The variable P is hereinafter defined to be the number of signal vectors that are received substantially at the same time (e.g., concurrently, within a given amount of time, etc.). Thus, for a HARQ or ARQ protocol, P may be equal to one, and therefore only one decoding metric calculator 902 is necessary. For repetition coding or another suitable predetermined transmission scheme, P may be equal to N, and block diagram 900 may be reduced to block diagram 800 (FIG. 8). For other suitable protocols, $1<P<N$. For simplicity, it is assumed that P is divisible by N. In this scenario, there are a total of N/P transmissions of P signal vectors. The present invention, however, is not limited to this constrained situation. Also, for clarity, subscripts on any combined distance, D', will refer to the number of distances included in the combination. For example, $D_i'$ may refer to a combined distance that includes distances from received vectors $y_1, \ldots, y_i$ or $y_{i+1}, \ldots, y_{2i}$, etc.

When a first set of P signal vectors is received by the receiver of FIG. 9, no previous information about the common transmit signal vector is available. Therefore, the components of block diagram 900 may operate in substantially the same manner as the components of block diagram 800 for N=P. Decoding metric calculator 902 may compute P sets of distances, $\{D\}_1, \ldots, \{D\}_P$, for the P received signal vectors. Combiner 906 may then combine distances from the P sets of distances to create a set of combined distances, $\{D'_P\}$. This set of combined distances may be stored in storage 908 for later use. In the meantime, LLR calculator 904 may use $\{D_P'\}$ to calculate an estimate of the transmitted bit sequence, such as an LLR given by equation (11) for each bit in the transmitted sequence. Therefore, after a first set of P signal vectors is received, block diagram 900 may be used to compute a nearly optimal LLR for the number of signal vectors thus received.

When a second set of P signal vectors is received, decoding metric calculators 902 may produce P new sets of distances for the newly received P signal vectors. Combiner 906 may combine these newly calculated sets of distances with the combined distances from the first P signal vectors stored in storage 908. Thus, the resulting set of combined distances, $\{D_{2P}'\}$, may include information from all 2P signal vectors that have been received up to that point. Furthermore, the combined distances in $\{D_{2P}'\}$ may take on the same values as if all 2P signal vectors were received concurrently. Therefore, LLR calculator 804 may use the set of combined distances to compute an LLR, where the LLR is optimal for the number of received signal vectors thus received. Also, $\{D_{2P}'\}$ may be stored in storage 908 by overwriting $\{D_P'\}$, the previously stored set of combined signal vectors. $\{D_P'\}$ may be overwritten because all information from $\{D_P'\}$ is contained within the newly stored set of combined distances. Therefore, the stored value of $\{D_{2P}'\}$ may be used when a third set of signal vectors is received.

Using the storage system shown in FIG. 9, a receiver may incrementally change its set of combined distances as new sets of signal vectors are received. After each set of P signal vectors is received, block diagram 900 may produce a nearly optimal estimate of the common transmit signal vector for the given number signal vectors that have been received. Thus, the effectiveness of the receiver does not depend on the number of received vectors. This is particularly useful for certain transmission protocols, such as HARQ, where the number of received signal vectors may vary.

Another benefit of the receiver configuration in FIG. 9 is memory efficiency. After each set of P signal vectors is received, a new set of combined distances, $\{D'\}$, is calculated. This set of combined distances may replace all of the previous information stored in memory. Therefore, the memory requirement of storage 908 does not depend on the number of received vectors. In particular, storage 908 may be just large enough to store one set of combined signal vectors, $\{D'\}$. This is in contrast to a system that re-computes $\{D'\}$ each time a new set of vectors is received. In this scenario, the receiver would need to save the distance calculations, or the received signal vectors and channel matrices, from all previous transmissions.

Figure 10:
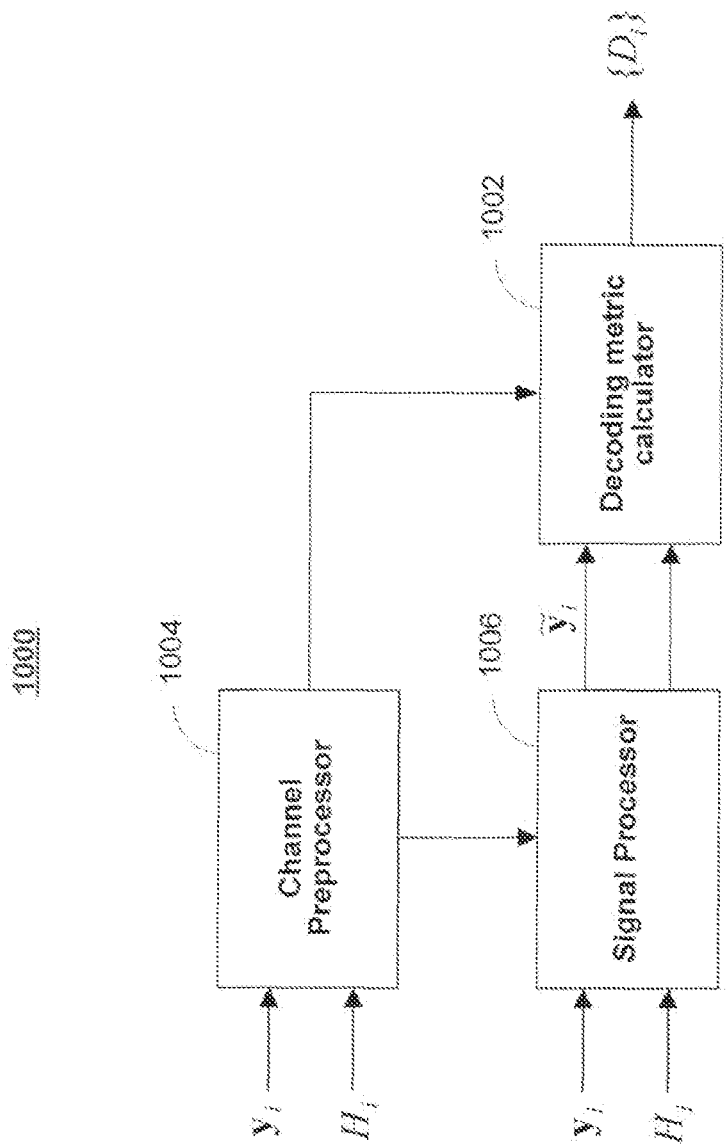
FIGS. 10-11 show detailed embodiments of a component of the block diagrams in FIGS. 8-9.
Figure 11:
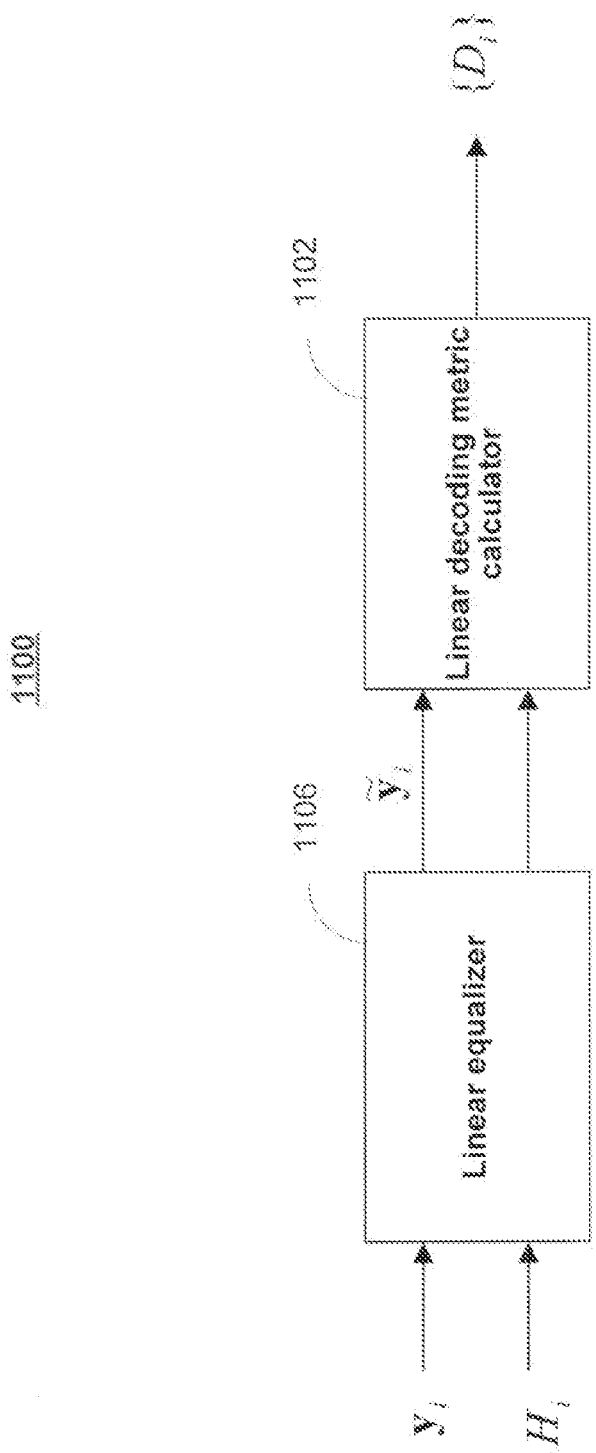

FIGS. 10 and 11 show different configurations for calculating decoding metrics, and may be used in place of each decoding metric calculator 802 in FIG. 8 or decoding metric calculator 902 in FIG. 9. In particular, the block diagrams of FIGS. 10 and 11 illustrate two techniques that may be used to implement high performance decoding metrics that are less computationally expensive than $\|y_i - H_i \hat{x}\|^2$.

Referring first to FIG. 10, block diagram 1000 can include LLR calculator 1002, channel preprocessor 1004, and signal processor 1006. With these additional components, signal processor 1006 may process a received signal vector based on channel information obtained from channel preprocessor 1004 in order to reduce the complexity of the decoding metric. For example, the previously described distance calculation, $\|y_i - H_i \hat{x}\|^2$, multiples a vector, x, by a matrix, $H_i$, which may have all non-zero terms. Channel preprocessor 1004 and signal processor 1006 could reduce the complexity of decoding metric calculator 1002 by reducing the number of non-zero terms in the matrix used in the multiplication. This would allow decoding metric calculator 1002 to compute fewer calculations for each distance in the set, $\{D\}_i$. For large transmit vector sizes, which results in a large number of entries in $\{D\}_i$, reducing the number of non-zero terms in the matrix may result in significant reduction in the number of computations.

Therefore, in some embodiments, block diagram 1000 may use QR decomposition to replace full-matrix $H_i$ in the distance calculation with an upper-triangular matrix, $R_i$. Channel preprocessor 1002 may perform QR decomposition on the channel matrix, $H_i$, to produce a matrix $Q_i$, whose columns are orthogonal and have unit norm, and an upper triangular matrix, $R_i$. Thus, the corresponding received signal vector, $y_i$, may be represented as, $$y_i = H_i x + n_i \tag{12}$$

$$= Q_i R_i x + n_i. \tag{13}$$

Signal processor 1006 may multiply the received signal vector by $Q_i^*$, where $Q_i^*$ is the conjugate transpose of $Q_i^*$. This produces a processed vector that may be given by, $$Q_i^* y_i = Q_i^* Q_i R_i x + Q_i^* n_i \tag{14}$$

$$= R_i x + Q_i^* n_i. \tag{15}$$

Because $Q_i^*$ has orthogonal columns that have unit norm, it does not amplify the noise component or add correlation among the noise components. Thus, the decoding metric implemented by decoding metric calculator 1002 may be changed to $\|Q_i^* y_i - R_i \hat{x}\|^2$ without degrading the decoding performance. Accordingly, the overall receiver (e.g., receiver 112 using the receiver configuration of FIG. 8 or 9) may be a nearly optimal receiver that can calculate an LLR given by, $$LLR_{DLC-ML} = \tag{16}$$

$$\min_{\hat{x}^{(0)} \in \chi_\lambda^{(0)}} \left\{ \sum_{i=1}^N \|Q_i^* y_i - R_i \hat{x}^{(0)}\|^2 \right\} - \min_{\hat{x}^{(1)} \in \chi_\lambda^{(1)}} \left\{ \sum_{i=1}^N \|Q_i^* y_i - R_i \hat{x}^{(1)}\|^2 \right\}.$$

Referring now to FIG. 11, block diagram 1100 shows a decoding metric calculator for computing a decoding metric using equalized versions of received signal vectors. Block diagram 1100 includes linear equalizer 1106 and linear decoding metric calculator 1102. Using linear equalizer 1104, a received signal vector may be equalized such that the resulting equalized signal vector may be in a form that allows decoding metric calculators 1102 to implement a decoding metric that is less complex than any of the previously described squared distance metrics (e.g., $\|y_i - H_i \hat{x}\|^2$ or $\|Q_i^* y_i - R_i \hat{x}\|^2$).

In some embodiments of FIG. 11, linear equalizer 1106 may be a zero-forcing (ZF) equalizer. Zero-forcing is a technique used to ideally eliminate the effect of a channel from a received signal vector, and thus produce a noisy version of x. In this way, each equalized signal vector may be compared directly (e.g., component-by-component) to the various possible values of $\hat{x}$. To cancel out the effect of a channel, linear equalizer 1106 may multiply a received signal vector, $y_i$, by the pseudo-inverse, $H_i^+$, of its associated channel response matrix, $H_i$. This produces an equalized signal vector, $$\tilde{y}_i = H_i^+ y_i \tag{17}$$

$$= x + \tilde{n}_i. \tag{18}$$

As expected, $\tilde{y}_i$ is equal to the common transmit signal vector, x, affected by additive effective noise $\tilde{n}_i = H_i^+ n_i$. Depending on the value of $H_i^+$, this effective noise may be correlated and amplified. Therefore, zero-forcing may have high, though not optimal, performance.

Following zero-forcing equalization, each of the $N_t$ components in an equalized signal vector, $\tilde{y}_i$, may be regarded as independent. Namely, rather than treating the N equalized signal vectors as N vectors from a common transmit signal vector, they may be treated as N sets of $N_t$ signals received from $N_t$ common transmit signals. Thus, each signal may be written as $$[\tilde{y}_i]_k = [x]_k + [\tilde{n}_i]_k, \ i=1, \ldots, N. \tag{19}$$

$[\tilde{y}_i]_k$ represents the kth signal in the ith signal vector, and may be modeled as a common transmit signal $[x]_k$ affected by noise component $[\tilde{n}_i]_k$, where the noise component has a covariance of $$E\|[\tilde{n}_i]_k [\tilde{n}_i]_k^*\| = [H_i^+ H_i^{+*}]_{k,k}. \tag{20}$$

In equation (15), k,k indexes the (k,k)th element in a matrix. Therefore, decoding metric calculator 1102 may calculate the following metric, $$\sum_{k=1}^{N_t} \frac{|[H_i^+ y_i]_k - [x]_k|^2}{[H_i^+ H_i^{+*}]_{k,k}}, \tag{21}$$

where the distance calculation is weighted to normalize the effective noise components. The distance calculation, $[H_i^+ y_i]_k - [x]_k|^2$, is clearly linear, and may therefore be implemented with relatively low complexity. Using zero-forcing, the overall receiver (e.g., receiver 112 using the receiver configuration of FIG. 8 or 9) may calculate an LLR according to, $$LLR = \min_{\hat{x}^{(0)} \in \chi_\lambda^{(0)}} \left\{ \sum_{i=1}^N \sum_{k=1}^{N_t} \frac{|[H_i^+ y_i]_k - [\hat{x}^{(0)}]_k|^2}{[H_i^+ H_i^{+*}]_{k,k}} \right\} - \tag{22}$$

$$\min_{\hat{x}^{(1)} \in \chi_\lambda^{(1)}} \left\{ \sum_{i=1}^N \sum_{k=1}^{N_t} \frac{|[H_i^+ y_i]_k - [\hat{x}^{(1)}]_k|^2}{[H_i^+ H_i^{+*}]_{k,k}} \right\}$$

$$= \min_{\hat{x}^{(0)} \in \chi_\lambda^{(0)}} \left\{ \sum_{i=1}^N \frac{|[H_i^+ y_i]_k - [\hat{x}^{(0)}]_k|^2}{[H_i^+ H_i^{+*}]_{k,k}} \right\} - \tag{23}$$

$$\min_{\hat{x}^{(1)} \in \chi_\lambda^{(1)}} \left\{ \sum_{i=1}^N \frac{|[H_i^+ y_i]_k - [\hat{x}^{(1)}]_k|^2}{[H_i^+ H_i^{+*}]_{k,k}} \right\}$$

In other embodiments of FIG. 11, linear equalizer 1106 may be a minimum mean squared error (MMSE) equalizer. Like a ZF equalizer, an MMSE equalizer attempts to recover the transmitted signal vector from a received signal vector. Instead of multiplying a vector by $H_i^+$, linear equalizer 1106 may multiply a received signal vector by $p(pH_i + N_0 I)^{-1}$. Distance computation block 1102 may then calculate a linear decoding metric based on the MMSE-equalized signal vector using a similar technique as that described above in the ZF embodiment. The resulting LLR may have equal performance to an LLR calculated by zero-forcing.

Referring now to FIGS. 12A-12G, various exemplary implementations of the present invention are shown.

Figure 12A:
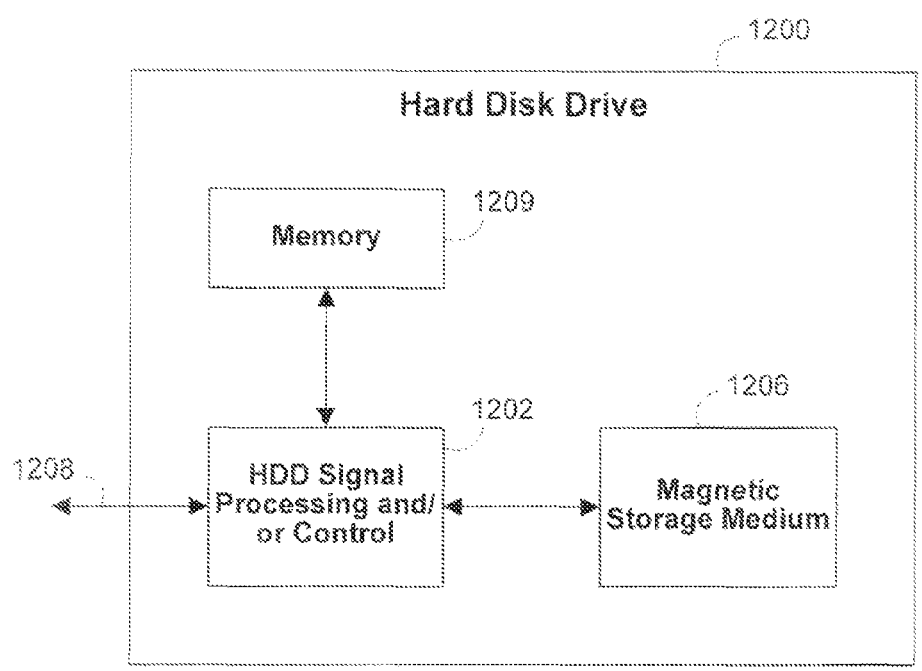
FIG. 12A is a block diagram of an exemplary hard disk drive that can employ the disclosed technology.

Referring now to FIG. 12A, the present invention can be implemented in a hard disk drive 1200. The present invention may implement either or both signal processing and/or control circuits, which are generally identified in FIG. 12A at 1202. In some implementations, the signal processing and/or control circuit 1202 and/or other circuits (not shown) in the HDD 1200 may process data, perform coding and/or encryption, perform calculations, and/or format data that is output to and/or received from a magnetic storage medium 1206.

The HDD 1200 may communicate with a host device (not shown) such as a computer, mobile computing devices such as personal digital assistants, cellular phones, media or MP3 players and the like, and/or other devices via one or more wired or wireless communication links 1208. The HDD 1200 may be connected to memory 1209 such as random access memory (RAM), nonvolatile memory such as flash memory, read only memory (ROM) and/or other suitable electronic data storage.

Figure 12B:
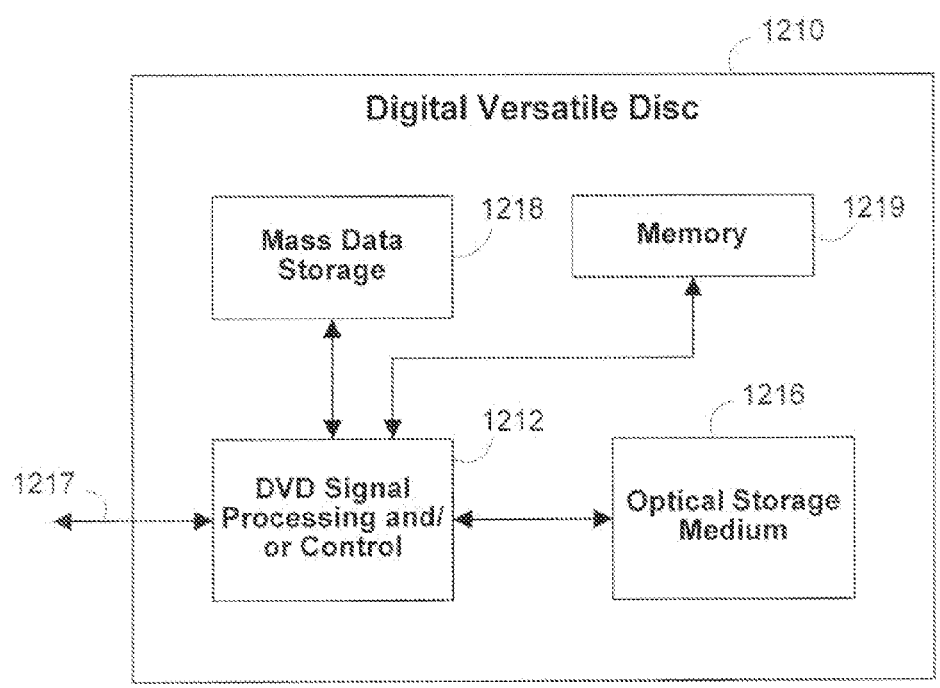
FIG. 12B is a block diagram of an exemplary digital versatile disc that can employ the disclosed technology.

Referring now to FIG. 12B, the present invention can be implemented in a digital versatile disc (DVD) drive 1210. The present invention may implement either or both signal processing and/or control circuits, which are generally identified in FIG. 12B at 1212, and/or mass data storage of the DVD drive 1210. The signal processing and/or control circuit 1212 and/or other circuits (not shown) in the DVD 1210 may process data, perform coding and/or encryption, perform calculations, and/or format data that is read from and/or data written to an optical storage medium 1216. In some implementations, the signal processing and/or control circuit 1212 and/or other circuits (not shown) in the DVD 1210 can also perform other functions such as encoding and/or decoding and/or any other signal processing functions associated with a DVD drive.

The DVD drive 1210 may communicate with an output device (not shown) such as a computer, television or other device via one or more wired or wireless communication links 1217. The DVD 1210 may communicate with mass data storage 1218 that stores data in a nonvolatile manner. The mass data storage 1218 may include a hard disk drive (HDD). The HDD may have the configuration shown in FIG. 12A. The HDD may be a mini HDD that includes one or more platters having a diameter that is smaller than approximately 1.8". The DVD 1210 may be connected to memory 1219 such as RAM, ROM, nonvolatile memory such as flash memory and/or other suitable electronic data storage.

Figure 12C:
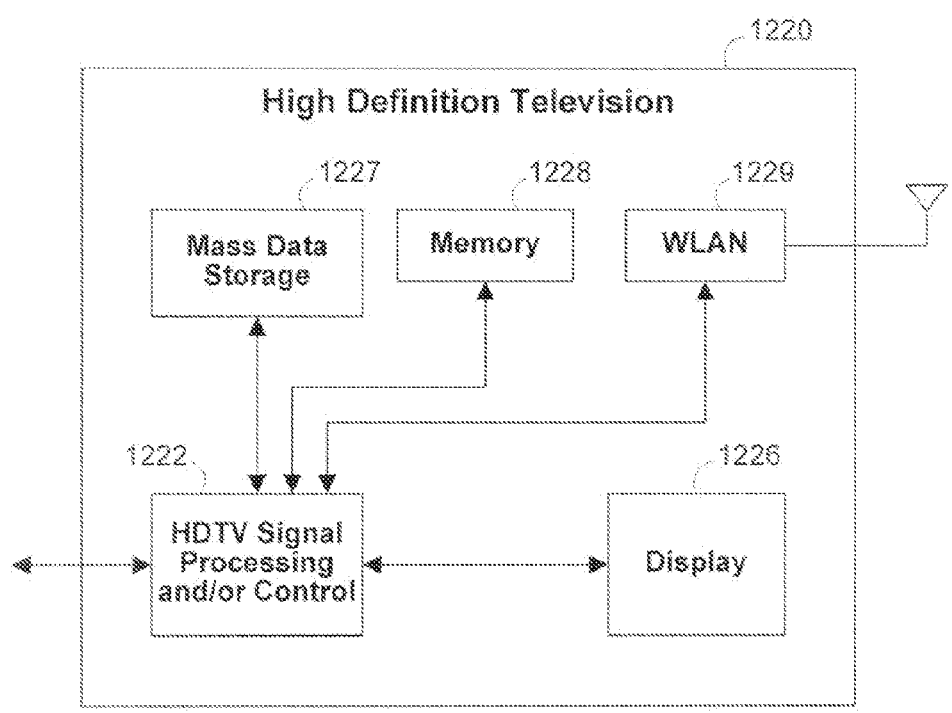
FIG. 12C is a block diagram of an exemplary high definition television that can employ the disclosed technology.

Referring now to FIG. 12C, the present invention can be implemented in a high definition television (HDTV) 1220. The present invention may implement either or both signal processing and/or control circuits, which are generally identified in FIG. 12C at 1222, a WLAN interface 1229 and/or mass data storage 1227 of the HDTV 1220. The HDTV 1220 receives HDTV input signals in either a wired or wireless format and generates HDTV output signals for a display 1226. In some implementations, signal processing circuit and/or control circuit 1222 and/or other circuits (not shown) of the HDTV 1220 may process data, perform coding and/or encryption, perform calculations, format data and/or perform any other type of HDTV processing that may be required.

The HDTV 1220 may communicate with mass data storage 1227 that stores data in a nonvolatile manner such as optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". The HDTV 1220 may be connected to memory 1228 such as RAM, ROM, nonvolatile memory such as flash memory and/or other suitable electronic data storage. The HDTV 1220 also may support connections with a WLAN via a WLAN network interface 1229.

Figure 12D:
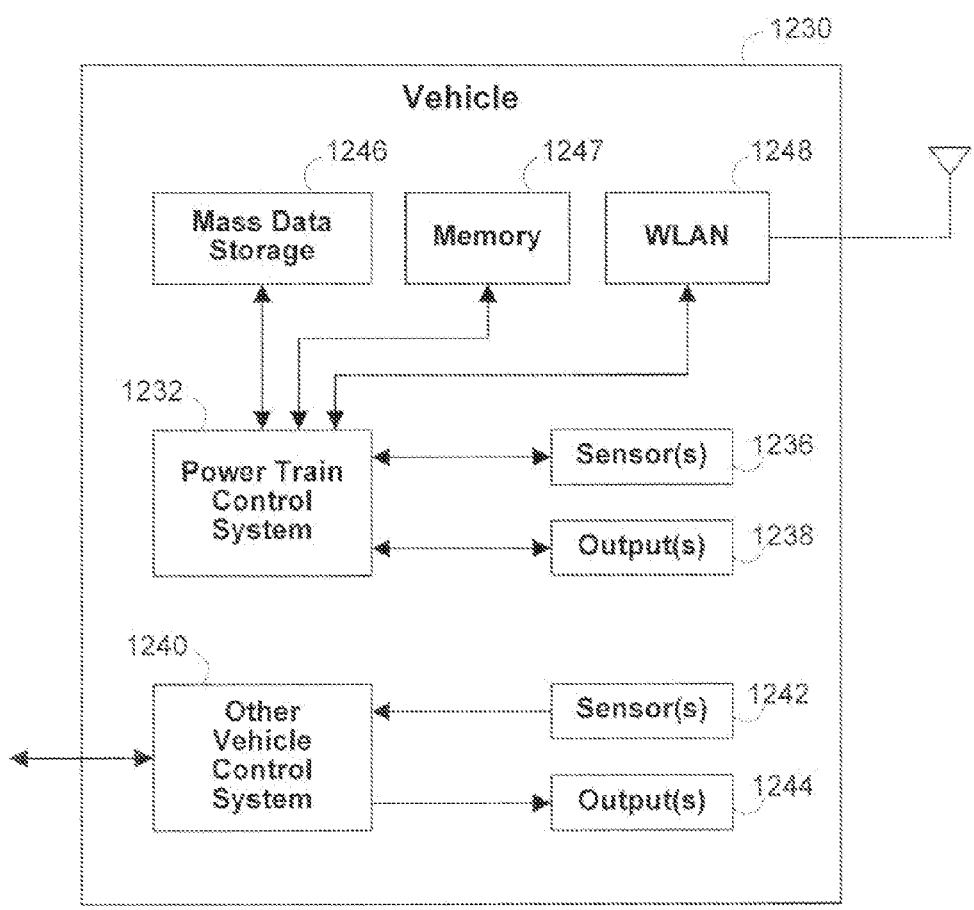
FIG. 12D is a block diagram of an exemplary vehicle that can employ the disclosed technology.

Referring now to FIG. 12D, the present invention implements a control system of a vehicle 1230, a WLAN interface 1248 and/or mass data storage 1246 of the vehicle control system. In some implementations, the present invention may implement a powertrain control system 1232 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1240 of the vehicle 1230. The control system 1240 may likewise receive signals from input sensors 1242 and/or output control signals to one or more output devices 1244. In some implementations, the control system 1240 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1232 may communicate with mass data storage 1246 that stores data in a nonvolatile manner. The mass data storage 1046 may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". The powertrain control system 1232 may be connected to memory 1247 such as RAM, ROM, nonvolatile memory such as flash memory and/or other suitable electronic data storage. The powertrain control system 1232 also may support connections with a WLAN via a WLAN network interface 1248. The control system 1240 may also include mass data storage, memory and/or a WLAN interface (all not shown).

Figure 12E:
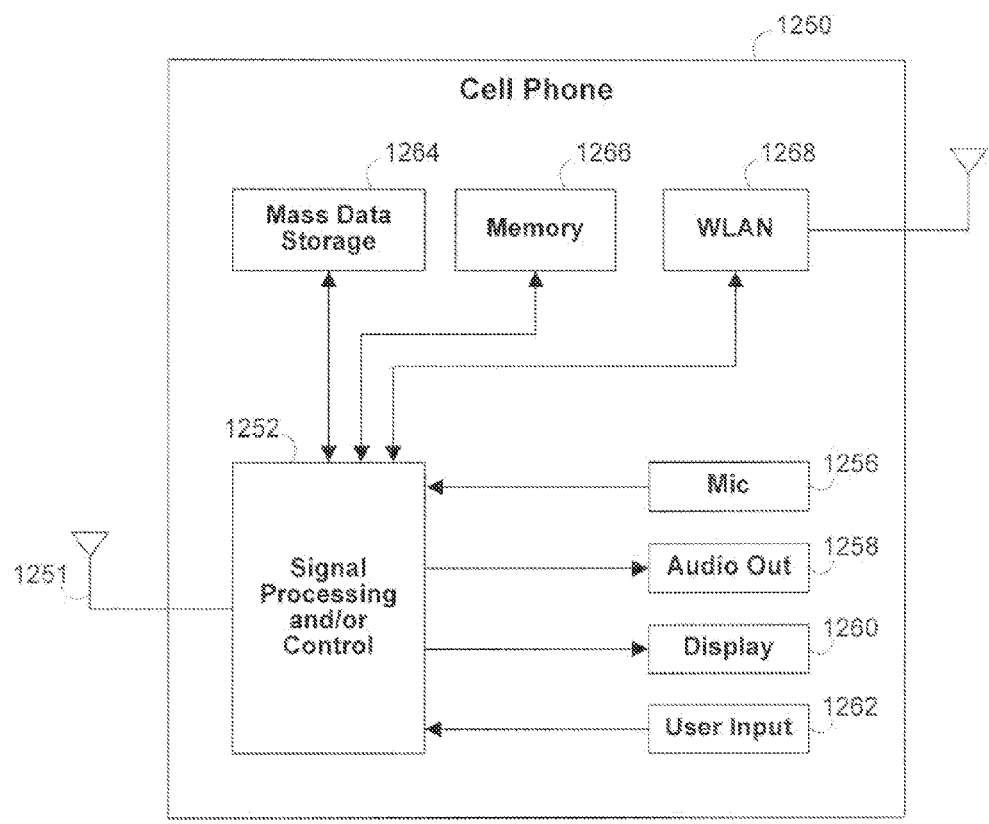
FIG. 12E is a block diagram of an exemplary cell phone that can employ the disclosed technology.

Referring now to FIG. 12E, the present invention can be implemented in a cellular phone 1250 that may include a cellular antenna 1251. The present invention may implement either or both signal processing and/or control circuits, which are generally identified in FIG. 12E at 1252, a WLAN interface 1268 and/or mass data storage 1264 of the cellular phone 1250. In some implementations, the cellular phone 1250 includes a microphone 1256, an audio output 1258 such as a speaker and/or audio output jack, a display 1260 and/or a user input 1262 such as a keypad, pointing device, voice actuation and/or other input device. The signal processing and/or control circuits 1252 and/or other circuits (not shown) in the cellular phone 1250 may process data, perform coding and/or encryption, perform calculations, format data and/or perform other cellular phone functions.

The cellular phone 1250 may communicate with mass data storage 1264 that stores data in a nonvolatile manner such as optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". The cellular phone 1250 may be connected to memory 1266 such as RAM, ROM, nonvolatile memory such as flash memory and/or other suitable electronic data storage. The cellular phone 1250 also may support connections with a WLAN via a WLAN network interface 1268.

Figure 12F:
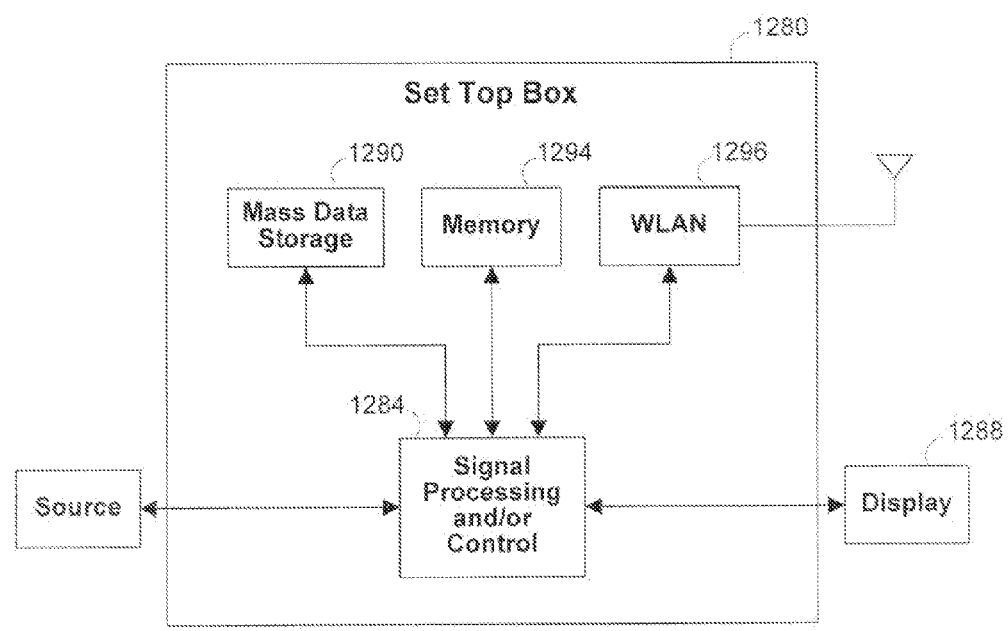
FIG. 12F is a block diagram of an exemplary set top box that can employ the disclosed technology.

Referring now to FIG. 12F, the present invention can be implemented in a set top box 1280. The present invention may implement either or both signal processing and/or control circuits, which are generally identified in FIG. 12F at 1284, a WLAN interface 1296 and/or mass data storage 1290 of the set top box 1280. The set top box 1280 receives signals from a source such as a broadband source and outputs standard and/or high definition audio/video signals suitable for a display 1288 such as a television and/or monitor and/or other video and/or audio output devices. The signal processing and/or control circuits 1284 and/or other circuits (not shown) of the set top box 1280 may process data, perform coding and/or encryption, perform calculations, format data and/or perform any other set top box function.

The set top box 1280 may communicate with mass data storage 1290 that stores data in a nonvolatile manner. The mass data storage 1290 may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". The set top box 1280 may be connected to memory 1294 such as RAM, ROM, nonvolatile memory such as flash memory and/or other suitable electronic data storage. The set top box 1280 also may support connections with a WLAN via a WLAN network interface 1296.

Figure 12G:
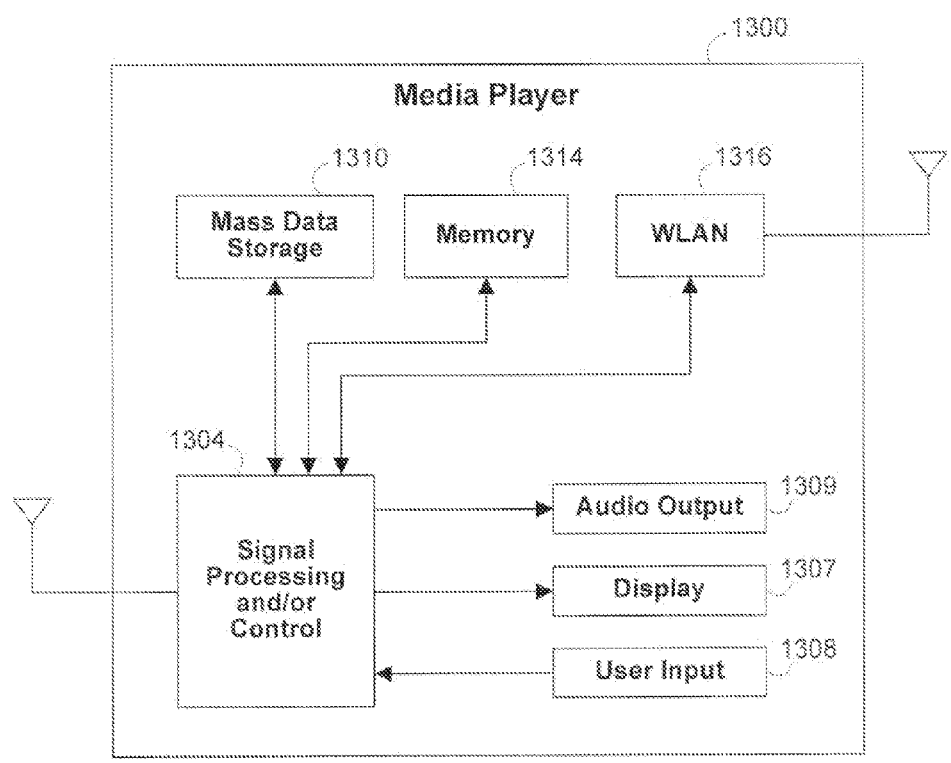
FIG. 12G is a block diagram of an exemplary media player that can employ the disclosed technology.

Referring now to FIG. 12G, the present invention can be implemented in a media player 1360. The present invention may implement either or both signal processing and/or control circuits, which are generally identified in FIG. 12G at 1304, a WLAN interface 1316 and/or mass data storage 1310 of the media player 1300. In some implementations, the media player 1300 includes a display 1307 and/or a user input 1308 such as a keypad, touchpad and the like. In some implementations, the media player 1300 may employ a graphical user interface (GUI) that typically employs menus, drop down menus, icons and/or a point-and-click interface via the display 1307 and/or user input 1308. The media player 1300 further includes an audio output 1309 such as a speaker and/or audio output jack. The signal processing and/or control circuits 1304 and/or other circuits (not shown) of the media player 1300 may process data, perform coding and/or encryption, perform calculations, format data and/or perform any other media player function.

The media player 1300 may communicate with mass data storage 1310 that stores data such as compressed audio and/or video content in a nonvolatile manner. In some implementations, the compressed audio files include files that are compliant with MP3 format or other suitable compressed audio and/or video formats. The mass data storage 1310 may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8".

The media player 1300 may be connected to memory 1314 such as RAM, ROM, nonvolatile memory such as flash memory and/or other suitable electronic data storage. The media player 1300 also may support connections with a WLAN via a WLAN network interface 1316. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implement in software.

What is claimed is:

1. A method for decoding a signal vector, the method comprising:
   receiving a plurality of signal vectors corresponding to a common transmit signal vector, where each of the plurality of received signal vectors has an associated channel response matrix;
   equalizing each of the plurality of received signal vectors using its associated channel response matrix;
   for each of the plurality of received signal vectors:
     computing a respective distance equation based on the corresponding equalized signal vector and an estimate of the common transmit signal vector, to produce a set of distance equations; and
     normalizing each distance equation in the set of distance equations based on the associated channel response matrix for the respective received signal vector; and
   decoding the common transmit signal vector based on the normalized distance equations.

2. The method of claim 1 further comprising summing the normalized distance equations.

3. The method of claim 2 further comprising calculating the estimate of the common transmit signal vector based on an assumption that $b_\lambda=0$ or $b_\lambda=1$, where $b_\lambda$ is the $\lambda^{th}$ bit of the estimate of the common transmit signal vector.

4. The method of claim 3, wherein equalizing each of the plurality of received signal vectors using its associated channel response matrix comprises calculating $H^+_i y_i$, where $H^+_i$ is a pseudo-inverse of the ith channel response matrix and $y_i[\cdot]$ is the ith received signal vector.

5. The method of claim 4, wherein computing a respective distance equation based on the corresponding equalized signal vector and the estimate of the common transmit signal vector comprises calculating at least one of $|[H^+_i y_i]_k - [\hat{x}^{(0)}]_k|^2$ and $|[H^+_i y_i]_k - [\hat{x}^{(1)}]_k|^2$ for the kth symbol of the common transmit signal vector, where $\hat{x}^{(0)}$ is the estimate of the common transmit signal vector when $b_\lambda=0$, and where $\hat{x}^{(1)}$ is the estimate of the common transmit signal vector when $b_\lambda=1$.

6. The method of claim 5, wherein normalizing each distance equation in the set of distance equations based on its associated channel response matrix comprises calculating at least one of $$\frac{|[H^+_i y_i]_k - [\hat{x}^{(0)}]_k|^2}{[H^+_i H^+_i]_{k,k}}$$

and $$\frac{|[H_i^+ y_i]_k - [\hat{x}^{(1)}]_k|^2}{[H_i^+ H_i^+]_{k,k}}.$$

7. The method of claim 6, wherein the set of distance equations is a first set of distance equations, the method further comprising:
    calculating a respective set of distance equations for each possible estimate of the common transmit signal vector, to produce a plurality of sets of distance equations;
    normalizing each distance equation in each set of distance equations based on its associated channel response matrix;
    summing the normalized distance equations in each set of distance equations to produce a plurality of decoding metrics; and
    comparing each of the plurality of decoding metrics to determine which of the decoding metrics has a minimum value.

8. The method of claim 7, wherein summing the normalized distance equations in each set of distance equations to produce a plurality of decoding metrics comprises calculating at least one of $$\sum_{i=1}^{N} \frac{|[H_i^+ y_i]_k - [\hat{x}^{(0)}]_k|^2}{[H_i^+ H_i^+]_{k,k}}$$

and $$\sum_{i=1}^{N} \frac{|[H_i^+ y_i]_k - [\hat{x}^{(1)}]_k|^2}{[H_i^+ H_i^+]_{k,k}}$$

for each set of distance equations, where N is a number of received signal vectors.

9. The method of claim 8, wherein comparing each of the plurality of decoding metrics to determine which of the decoding metrics has a minimum value comprises calculating at least one of $$\min_{\hat{x}^{(0)} \in X_\lambda^{(0)}} \left\{ \sum_{i=1}^{N} \frac{|[H_i^+ y_i]_k - [\hat{x}^{(0)}]_k|^2}{[H_i^+ H_i^+]_{k,k}} \right\}$$

and $$\min_{\hat{x}^{(1)} \in X_\lambda^{(1)}} \left\{ \sum_{i=1}^{N} \frac{|[H_i^+ y_i]_k - [\hat{x}^{(1)}]_k|^2}{[H_i^+ H_i^+]_{k,k}} \right\}.$$

10. The method of claim 9 further comprising computing a log likelihood ratio by calculating $$\min_{\hat{x}^{(0)} \in X_\lambda^{(0)}} \left\{ \sum_{i=1}^{N} \frac{|[H_i^+ y_i]_k - [\hat{x}^{(0)}]_k|^2}{[H_i^+ H_i^+]_{k,k}} \right\} - \min_{\hat{x}^{(1)} \in X_\lambda^{(1)}} \left\{ \sum_{i=1}^{N} \frac{|[H_i^+ y_i]_k - [\hat{x}^{(1)}]_k|^2}{[H_i^+ H_i^+]_{k,k}} \right\}.$$

11. A system for decoding a signal vector, the system comprising:
    a receiver that receives a plurality of signal vectors corresponding to a common transmit signal vector, where each of the plurality of received signal vectors has an associated channel response matrix;
    a processor that:
        equalizes each of the plurality of received signal vectors using its associated channel response matrix;
        for each of the plurality of received signal vectors:
            computes a respective distance equation based on the corresponding equalized signal vector and an estimate of the common transmit signal vector, to produce a set of distance equations; and
            normalizes each distance equation in the set of distance equations based on the associated channel response matrix for the respective received signal vector; and
    a decoder that decodes the common transmit signal vector based on the normalized distance equations.

12. The system of claim 11, wherein the processor sums the normalized distance equations.

13. The system of claim 12, wherein the processor calculates the estimate of the common transmit signal vector based on an assumption that $b_\lambda = 0$ or $b_\lambda = 1$, where $b_\lambda$ is the $\lambda^{th}$ bit of the estimate of the common transmit signal vector.

14. The system of claim 13, wherein the processor equalizes each of the plurality of received signal vectors by calculating $H^+_i y_i$, where $H^+_i$ is a pseudo-inverse of the ith channel response matrix and $y_i[\cdot]$ is the ith received signal vector.

15. The system of claim 14, wherein the processor computes a respective distance equation for each of the plurality of received signal vectors by calculating at least one of $|[H_i^+ y_i]_k - [\hat{x}^{(0)}]_k|^2$ and $|[H_i^+ y_i]_k - [\hat{x}^{(1)}]_k|^2$ for the kth symbol of the common transmit signal vector, where $\hat{x}^{(0)}$ is the estimate of the common transmit signal vector when $b_\lambda = 0$, and where $\hat{x}^{(1)}$ is the estimate of the common transmit signal vector when $b_\lambda = 1$.

16. The system of claim 15, wherein the processor normalizes each distance equation in the set of distance equations by calculating at least one of $$\frac{|[H_i^+ y_i]_k - [\hat{x}^{(0)}]_k|^2}{[H_i^+ H_i^+]_{k,k}}$$

and $$\frac{|[H_i^+ y_i]_k - [\hat{x}^{(1)}]_k|^2}{[H_i^+ H_i^+]_{k,k}}.$$

17. The system of claim 16, wherein the set of distance equations is a first set of distance equations, and wherein the processor:
    calculates a respective set of distance equations for each possible estimate of the common transmit signal vector, to produce a plurality of sets of distance equations;

normalizes each distance equation in each set of distance equations based on its associated channel response matrix;
sums the normalized distance equations in each set of distance equations to produce a plurality of decoding metrics; and
compares each of the plurality of decoding metrics to determine which of the decoding metrics has a minimum value.

18. The system of claim 17, wherein the processor sums the normalized distance equations in each set of distance equations by calculating at least one of $$\sum_{i=1}^{N} \frac{|[H_i^+ y_i]_k - [\hat{x}^{(0)}]_k|^2}{[H_i^+ H_i^+]_{k,k}}$$

and $$\sum_{i=1}^{N} \frac{|[H_i^+ y_i]_k - [\hat{x}^{(1)}]_k|^2}{[H_i^+ H_i^+]_{k,k}}$$

for each set of distance equations, where N is a number of received signal vectors.

19. The system of claim 18, wherein the processor compares each of the plurality of decoding metrics to determine which of the decoding metrics has a minimum value by calculating at least one of $$\min_{\hat{x}^{(0)} \in X_\lambda^{(0)}} \left\{ \sum_{i=1}^{N} \frac{|[H_i^+ y_i]_k - [\hat{x}^{(0)}]_k|^2}{[H_i^+ H_i^+]_{k,k}} \right\}$$

and $$\min_{\hat{x}^{(1)} \in X_\lambda^{(1)}} \left\{ \sum_{i=1}^{N} \frac{|[H_i^+ y_i]_k - [\hat{x}^{(1)}]_k|^2}{[H_i^+ H_i^+]_{k,k}} \right\}.$$

20. The system of claim 19, wherein the decoder computes a log likelihood ratio by calculating $$\min_{\hat{x}^{(0)} \in X_\lambda^{(0)}} \left\{ \sum_{i=1}^{N} \frac{|[H_i^+ y_i]_k - [\hat{x}^{(0)}]_k|^2}{[H_i^+ H_i^+]_{k,k}} \right\} - \min_{\hat{x}^{(1)} \in X_\lambda^{(1)}} \left\{ \sum_{i=1}^{N} \frac{|[H_i^+ y_i]_k - [\hat{x}^{(1)}]_k|^2}{[H_i^+ H_i^+]_{k,k}} \right\}.$$

* * * * *